United States Patent
Maruoka et al.

(10) Patent No.: US 11,420,678 B2
(45) Date of Patent: Aug. 23, 2022

(54) TRACTION ASSIST DISPLAY FOR TOWING A VEHICLE

(71) Applicant: AISIN CORPORATION, Kariya (JP)

(72) Inventors: Tetsuya Maruoka, Okazaki (JP); Kazuya Watanabe, Anjo (JP)

(73) Assignee: AISIN CORPORATION, Kariya (JP)

( * ) Notice: Subject to any disclaimer, the term of this patent is extended or adjusted under 35 U.S.C. 154(b) by 294 days.

(21) Appl. No.: 16/611,304

(22) PCT Filed: Feb. 21, 2018

(86) PCT No.: PCT/JP2018/006258
§ 371 (c)(1),
(2) Date: Nov. 6, 2019

(87) PCT Pub. No.: WO2018/207427
PCT Pub. Date: Nov. 15, 2018

(65) Prior Publication Data
US 2020/0164920 A1    May 28, 2020

(30) Foreign Application Priority Data

May 11, 2017    (JP) .............................. JP2017-094849

(51) Int. Cl.
*B62D 13/06* (2006.01)
*B62D 15/02* (2006.01)

(52) U.S. Cl.
CPC .......... *B62D 13/06* (2013.01); *B62D 15/027* (2013.01); *B60R 2300/607* (2013.01); *B60R 2300/808* (2013.01); *B60W 2300/14* (2013.01)

(58) Field of Classification Search
CPC .... B62D 13/06; B62D 15/027; B62D 15/029; B60R 2300/607; B60R 2300/808; B60W 2300/14
See application file for complete search history.

(56) References Cited

U.S. PATENT DOCUMENTS

2008/0231701 A1*  9/2008  Greenwood ......... H04N 5/2253
                                                            348/148
2010/0007478 A1   1/2010  Hahn et al.
(Continued)

FOREIGN PATENT DOCUMENTS

JP    2010-513109 A    4/2010
JP    2016-081198 A    5/2016

OTHER PUBLICATIONS

International Search Report for PCT/JP2018/006258 dated May 15, 2018 [PCT/ISA/210].
(Continued)

*Primary Examiner* — Sze-Hon Kong
(74) *Attorney, Agent, or Firm* — Sughrue Mion, PLLC

(57) ABSTRACT

A traction assist apparatus includes a memory and a hardware processor coupled to the memory. The hardware processor is configured to: acquire first coupling information representing a current coupling posture of a towed vehicle to a towing vehicle and acquire second coupling information representing a future coupling posture of the towed vehicle where the towing vehicle moves backward at a current steering angle; and display a first indicator and a second indicator on a display device in a comparable mode, the first indicator indicating the towed vehicle corresponding to the first coupling information, the second indicator indicating the towed vehicle corresponding to the second coupling information.

11 Claims, 12 Drawing Sheets

(56) References Cited

U.S. PATENT DOCUMENTS

| | | | |
|---|---|---|---|
| 2010/0171828 A1* | 7/2010 | Ishii | G06T 7/246 348/135 |
| 2014/0085472 A1* | 3/2014 | Lu | B60R 1/002 348/148 |
| 2015/0198949 A1* | 7/2015 | Boos | B62D 15/0285 701/2 |
| 2015/0203156 A1* | 7/2015 | Hafner | B62D 15/027 701/36 |
| 2016/0039456 A1* | 2/2016 | Lavoie | B60D 1/62 701/41 |
| 2016/0059888 A1* | 3/2016 | Bradley | B60T 7/22 701/41 |
| 2016/0059889 A1* | 3/2016 | Herzog | B62D 15/027 701/41 |
| 2016/0139599 A1* | 5/2016 | Czlapinski | B62D 53/08 701/41 |
| 2017/0008560 A1* | 1/2017 | Kyrtsos | B60W 10/18 |
| 2017/0073003 A1* | 3/2017 | Shepard | B62D 13/06 |
| 2018/0037261 A1* | 2/2018 | Shepard | B62D 13/06 |
| 2018/0124350 A1* | 5/2018 | Greenwood | H04N 5/232939 |

OTHER PUBLICATIONS

Written Opinion for PCT/JP2018/006258 dated May 15, 2018 [PCT/ISA/237].

\* cited by examiner

TRACTION ASSIST DISPLAY FOR TOWING A VEHICLE

CROSS REFERENCE TO RELATED APPLICATIONS

This application is a National Stage of International Application No. PCT/JP2018/006258 filed Feb. 21, 2018, claiming priority based on Japanese Patent Application No. 2017-094849 filed May 11, 2017 which designates the United States, incorporated herein by reference.

TECHNICAL FIELD

Embodiments of the present invention relate to a traction assist apparatus.

BACKGROUND ART

Conventionally, a towing vehicle for towing a towed vehicle (a trailer) has been known. At a rear portion of the towing vehicle, a traction device constituted by a traction bracket, a coupling ball (a hitch ball), and the like is provided to tow the towed vehicle in a manner of allowing the towed vehicle to turn. When the towing vehicle moves forward in a state where the towing vehicle and the towed vehicle are coupled, the towed vehicle moves so as to substantially follow a steering state of the towing vehicle. On the other hand, for example, when the towing vehicle moves backward for parking or the like, that is, when the towed vehicle is pushed by the towing vehicle, the towed vehicle behaves differently from the steering state of the towing vehicle in some cases. For example, there is a case where the towed vehicle is greatly bent at a portion of the traction device, or reversely, the bending angle decreases depending on a coupling angle between the towing vehicle and the towed vehicle at that time. Therefore, a driving assist device is proposed, which displays a travel trajectory of a towed vehicle in a case where the towed vehicle moves at a current steered angle of a towing vehicle or displays a message relating to traveling based on an image captured by an imaging device provided at a rear portion of the towed vehicle.

CITATION LIST

Patent Literature

Patent Literature 1: Patent Application Laid-open Publication JP 2016-081198 A

SUMMARY OF INVENTION

Problem to be Solved by the Invention

In the related art, however, it is difficult for a user (a driver) to intuitively understand a position to which a towed vehicle changes from a current position in the future with respect to a towing vehicle, although a movement trajectory of the towed vehicle is displayed. Thus, there is a problem that it is easy to get lost in steering and a steering burden is likely to increase. Therefore, if the driver can be notified of a current state and a future (prospective) state of the towed vehicle in an intuitively understandable state, a handling burden on the driver can be reduced, and it is meaningful.

Means for Solving Problem

A traction assist apparatus according to an embodiment includes, for example, a memory and a hardware processor coupled to the memory. The hardware processor is configured to: acquire first coupling information representing a current coupling posture of a towed vehicle to a towing vehicle and acquire second coupling information representing a future coupling posture of the towed vehicle where the towing vehicle moves backward at a current steering angle; and a control unit configured to display a first indicator and a second indicator on a display device in a comparable mode, the first indicator indicating the towed vehicle corresponding to the first coupling information, the second indicator indicating the towed vehicle corresponding to the second coupling information. According to this configuration, a second indicator, which indicates a future coupling posture of a towed vehicle where a towing vehicle moves backward at a current steering angle (a steered angle), is displayed in a mode to be comparable with a first indicator indicating a current coupling posture of the towed vehicle, so that it is easy to understand a behavior of the towed vehicle from the present to the future. In addition, as a result of the easy understanding of the behavior of the towed vehicle, steering to move the towed vehicle in a desired direction is facilitated, and the handling burden can be reduced.

The hardware processor in the traction assist apparatus according to an embodiment may acquire a towing vehicle turning center position where the towing vehicle moves backward at the current steering angle and a towed vehicle turning center position where the towed vehicle moves backward in the coupling posture corresponding to the first coupling information, and may acquire the second coupling information based on a comparison result between the towing vehicle turning center position and the towed vehicle turning center position. According to this configuration, when the towing vehicle and the towed vehicle have the same turning center, the towing vehicle and the towed vehicle move backward while exhibiting the same behavior. Conversely, when turning center positions are different, the towing vehicle and the towed vehicle move backward while exhibiting different behaviors. In this case, if the towing vehicle moves backward while maintaining the current steering angle, the towed vehicle turns in accordance with the magnitude of a difference between the turning center positions. Thus, a display position of the second indicator can be easily estimated.

The hardware processor in the traction assist apparatus according to an embodiment may acquire a first steering angle indicating the current steering angle of the towing vehicle, a towed vehicle turning center position of the towed vehicle based on the first coupling information, and a second steering angle indicating a steering angle of the towing vehicle where the towed vehicle turning center position is used as a turning center, and may acquire the second coupling information based on a comparison result between the first steering angle and the second steering angle. According to this configuration, when moving backward in a state where there is a difference between a first steering angle and a second steering angle, the towed vehicle turns in accordance with the difference. Thus, the display position of the second indicator can be easily estimated.

The hardware processor in the traction assist apparatus according to an embodiment may change a display mode of the second indicator in accordance with magnitude of a difference between the first coupling information and the second coupling information. According to this configuration, when the towing vehicle moves backward with the current steering angle, a display mode of the second indicator changes depending on a degree of a posture (turning)

of the towed vehicle. Thus, it is possible to display the change in the behavior of the towed vehicle to be easily understood by the driver.

The hardware processor in the traction assist apparatus according to an embodiment may display the second indicator to be highlighted when a towed vehicle turning center position of the towed vehicle based on the first coupling information exists, on an extension line of a rear wheel axle of the towing vehicle, between a towing vehicle right turning center position based on a maximum right steering angle of the towing vehicle and a towing vehicle left turning center position based on a maximum left steering angle, the maximum right steering angle and the maximum left steering angle being defined with a current position of the towing vehicle as a center. According to this configuration, it is possible to promptly call attention when operation will become difficult as in a so-called "jackknife state" or the like, in which a coupling angle of the towed vehicle to the towing vehicle bends at a predetermined angle or greater.

The hardware processor in the traction assist apparatus according to an embodiment may hide the second indicator when the difference between the first coupling information and the second coupling information is a predetermined minimum value or less. According to this configuration, when the difference is a predetermined minimum value or less, the towing vehicle and the towed vehicle move backward while exhibiting substantially the same behavior. In this case, it becomes possible to avoid the display of excessive information, and the visibility of the display screen can be improved, which can contribute to reduction of the burden during steering. In addition, it is possible to make the user easily understand that the towed vehicle exhibits the same behavior as the towing vehicle.

The hardware processor in the traction assist apparatus according to an embodiment may display, on the display device in a bird's-eye view, at least either the first indicator or the second indicator and a third indicator indicating the towing vehicle. According to this configuration, it is possible to more easily grasp relative postures between the towing vehicle and the towed vehicle and grasp change in the relative postures.

The hardware processor in the traction assist apparatus according to an embodiment may hide the first indicator and the second indicator when the first coupling information cannot be acquired. According to this configuration, it is possible to avoid providing incomplete information when it is difficult to sufficiently recognize the towed vehicle. In addition, it is possible to make the user easily recognize that it is difficult to sufficiently recognize the towed vehicle.

DESCRIPTION OF EMBODIMENTS

Hereinafter, an exemplary embodiment of the present invention is disclosed. Configurations of the embodiment to be described hereinafter, and functions, results, and effects provided by the configurations are examples. The present invention can be implemented by configurations other than those disclosed in the following embodiment, and at least one of various effects based on the basic configurations and derivative effects thereof can be obtained.

Figure 1:
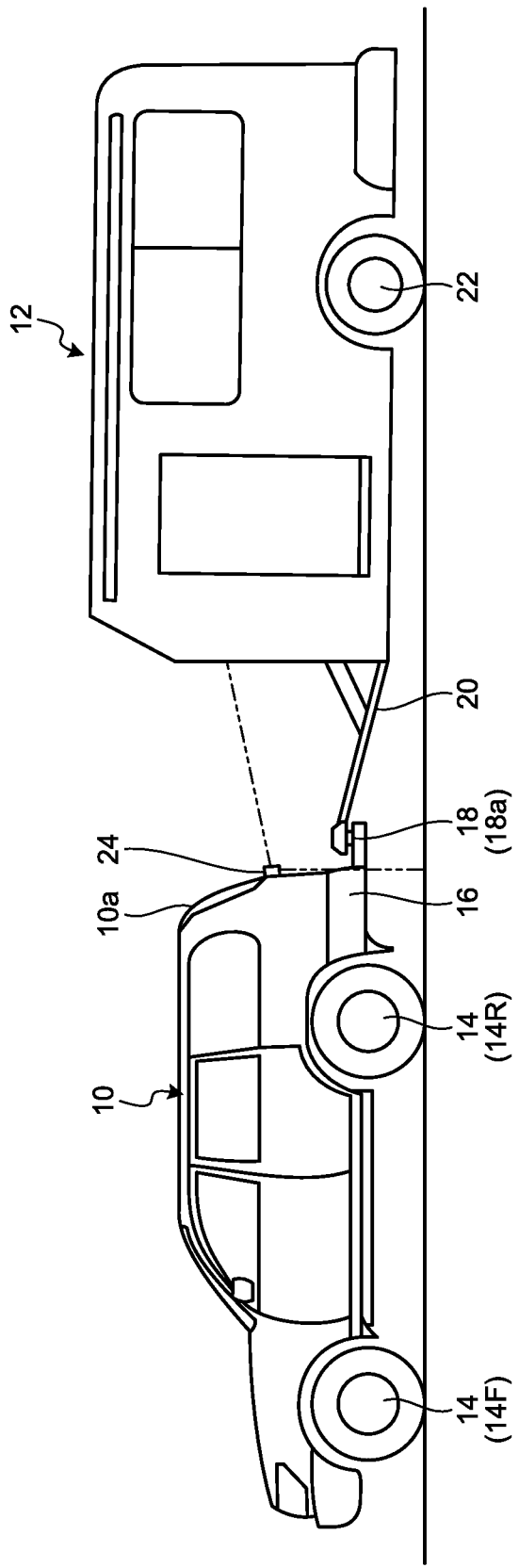
FIG. 1 is a side view schematically illustrating an example of a coupling state between a towing vehicle, which is equipped with a traction assist apparatus according to an embodiment, and a towed vehicle.
Figure 2:
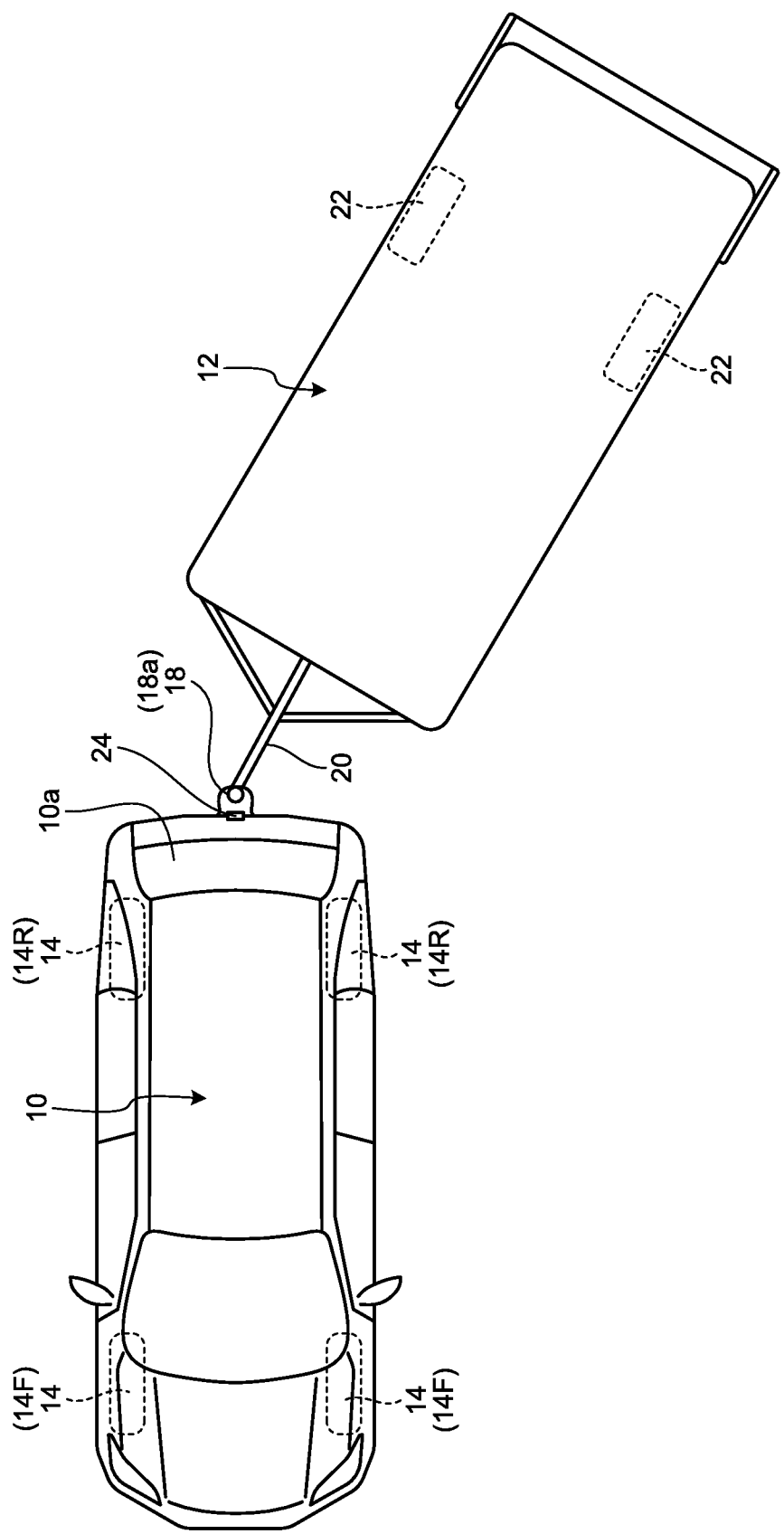
FIG. 2 is a top view schematically illustrating the example of the coupling state between the towing vehicle equipped with the traction assist apparatus according to the embodiment and the towed vehicle.
Figure 3:
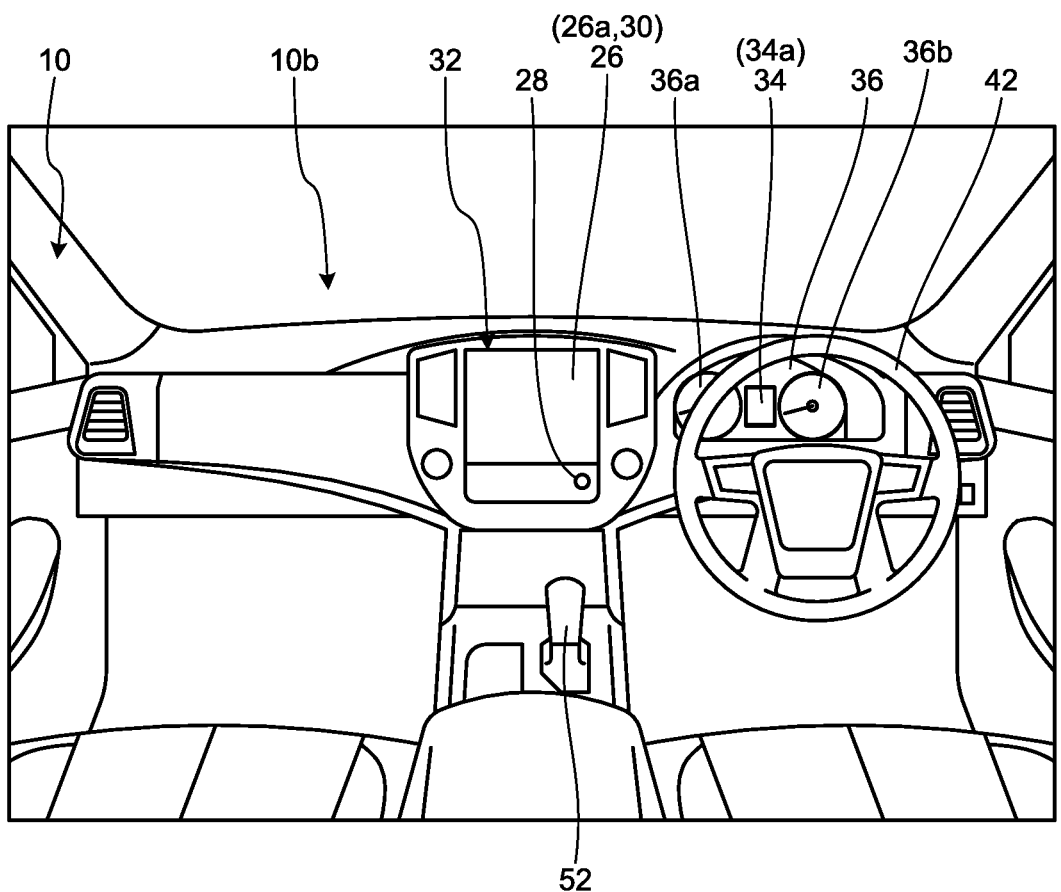
FIG. 3 is a diagram schematically illustrating an example of the interior of a passenger compartment of the towing vehicle equipped with the traction assist apparatus according to the embodiment.

FIG. 1 is a side view illustrating a towing vehicle 10, which is equipped with a traction assist apparatus of an embodiment, and a towed vehicle 12 towed by the towing vehicle 10. In FIG. 1, the left direction in the paper surface is the front (forward moving direction) with respect to the towing vehicle 10, and the right direction in the paper surface is the rear (backward moving direction) with respect to the towing vehicle 10. FIG. 2 is a top view of the towing vehicle 10 and the towed vehicle 12 illustrated in FIG. 1, and FIG. 3 is a diagram illustrating an example of the interior of a passenger compartment of the towing vehicle 10 equipped with the traction assist apparatus of the embodiment, and is a diagram of the interior of the passenger compartment as viewed from the rear of the towing vehicle 10.

The towing vehicle 10 may be, for example, an automobile (internal combustion engine automobile) using an internal combustion engine (an engine, which is not illustrated) as a driving source, may be an automobile (an electric vehicle, a fuel cell vehicle, or the like) using an electric motor (a motor, which is not illustrated) as a driving source, or may be an automobile (a hybrid automobile) using both the internal combustion engine and the electric motor as driving sources. The towing vehicle 10 may be a sport utility vehicle (SUV) as illustrated in FIG. 1, or may be a so-called "pickup truck" with which a loading platform is provided on the rear side of the vehicle. In addition, the towing vehicle 10 may be a general passenger car. The towing vehicle 10 can be equipped with various transmissions, and can be equipped with various devices (systems, parts, or the like) required to drive the internal combustion engine or the electric motor. In addition, schemes, the number, the layout, or the like of devices relating to driving of wheels 14 in the towing vehicle 10 can be set variously.

A traction device 18 (hitch) configured to tow the towed vehicle 12 protrudes from a lower portion of, for example, a central portion in a vehicle width direction of a rear bumper 16 of the towing vehicle 10. The traction device 18 is fixed to, for example, a frame of the towing vehicle 10. The traction device 18 includes, as an example, a hitch ball 18a having a spherical distal end that is erected in the vertical direction (vehicle up-down direction), and the hitch ball 18a is covered with a coupler provided at the distal end of a coupling member 20 fixed to the towed vehicle 12. As a result, the towing vehicle 10 and the towed vehicle 12 are coupled, and the towed vehicle 12 can swing (turn) in the vehicle width direction with respect to the towing vehicle 10. That is, a hitch ball 18a transmits a front/rear/left/right motion to the towed vehicle 12 (the coupling member 20), and receives power of acceleration or deceleration.

The towed vehicle 12 may be a box type including at least one of a boarding space, a living section, a storage space, and the like, for example, as illustrated in FIG. 1, and may be a loading platform type that loads luggage (for example, a container, a boat, or the like). The towed vehicle 12 illustrated in FIG. 1 includes a pair of trailer wheels 22 as an example. The towed vehicle 12 of FIG. 1 is a driven vehicle provided with driven wheels without including driving wheels and a steering wheel.

An imaging unit 24 is provided on a lower wall of a rear hatch 10a on the rear side of the towing vehicle 10. The imaging unit 24 is, for example, a digital camera that incorporates an imaging element such as a charge coupled device (CCD) and a CMOS image sensor (CIS). The imaging unit 24 can output moving image data (captured image data) at a predetermined frame rate. The imaging unit 24 has a wide-angle lens or a fish-eye lens, and can capture a range of, for example, 140° to 220° in the horizontal direction. In addition, an optical axis of the imaging unit 24 is set to the obliquely downward side. Accordingly, the imaging unit 24 sequentially captures a region including a rear end of the towing vehicle 10, the coupling member 20, and at least a front end of the towed vehicle 12 (for example, a range indicated by a two-dot chain line, see FIG. 1), and outputs the captured region as captured image data. The captured image data imaged by the imaging unit 24 can be used to detect a coupling posture (for example, first coupling information representing a coupling angle, presence or absence of coupling, or the like) between the towing vehicle 10 and the towed vehicle 12. In this case, it is possible to acquire a plurality of pieces of information such as the coupling state and the coupling angle with the towed vehicle 12 based on the captured image data imaged by the imaging unit 24 provided in the rear hatch 10a of the towing vehicle 10, so that the system configuration can be simplified and loads of arithmetic processing and image processing can be reduced. In another embodiment, the towing vehicle 10 may include a plurality of imaging units that image the side and front of the towing vehicle 10 in order to recognize an environment around the towing vehicle 10. In addition, an imaging unit may be provided on the side or the rear of the towed vehicle 12. It is possible to execute the arithmetic processing and image processing based on captured image data obtained by the plurality of imaging units to generate an image with a wider viewing angle or to generate a virtual bird's-eye view image (a planar image) when the towing vehicle 10 is viewed from above.

In addition, a display device 26, a sound output device 28, and the like are provided in a passenger compartment 10b of the towing vehicle 10 as illustrated in FIG. 3. The display device 26 is, for example, a liquid crystal display (LCD), an organic electroluminescent display (OELD), or the like. The sound output device 28 is a speaker as an example. In addition, the display device 26 is covered with a transparent operation input unit 30 (for example, a touch panel or the like) in the present embodiment as an example. A driver (a user) can visually recognize a video (an image) displayed on a screen 26a of the display device 26 via the operation input unit 30. In addition, the driver can execute an operation input (instruction input) by touching, pushing, or moving the operation input unit 30 with a finger or the like at a position corresponding to the video (image) displayed on the screen 26a of the display device 26. In addition, the display device 26, the sound output device 28, the operation input unit 30, and the like are provided in a monitor device 32 located at a central portion of a dashboard in the vehicle width direction (left-right direction) in the present embodiment as an example. The monitor device 32 can have an operation input unit (not illustrated) such as a switch, a dial, a joystick, and a push button. In addition, a sound output device (not illustrated) can be provided at another position in the passenger compartment 10b different from the monitor device 32, and a sound can be output from the sound output device 28 of the monitor device 32 and the other sound output device. In addition, the monitor device 32 is also used as a navigation system and an audio system in the present embodiment as an example, but a monitor device for a traction assist apparatus may be provided separately from these systems.

The display device 26 can display a first indicator and a second indicator in a comparable mode, when, for example, the towed vehicle 12 is towed backward (pushed back) by the towing vehicle 10. The first indicator is an indicator corresponding to the first coupling information representing a current coupling posture of the towed vehicle 12 to the towing vehicle 10. The second indicator is an indicator corresponding to the second coupling information representing a future coupling posture of the towed vehicle 12 where the towing vehicle 10 moves backward at the current steering angle (a steered angle). The first indicator is, for example, an icon (hereinafter, sometimes referred to as a "first icon") that imitates a posture to the towing vehicle 10 of the current towed vehicle 12 in a bird's-eye view. The second indicator is an icon (hereinafter, sometimes referred to as a "second icon") that imitates a posture to the towing vehicle 10 of the future towed vehicle 12 in a bird's-eye view (for example, when the towing vehicle 10 moves backward by 1 m). The display of the first icon changes according to an actual coupling angle of the towed vehicle 12 to the towing vehicle 10. In addition, the display of the second icon changes according to a steering angle of the towing vehicle 10.

In addition, the first icon and the second icon can display whether the coupling angle between the towing vehicle 10 and the towed vehicle 12 is in a balance state. For example, when the first icon (representing the current posture of the towed vehicle 12) overlaps the second icon (representing the future posture of the towed vehicle 12), that is, when the second icon is hidden, this case indicates that the posture of the towed vehicle 12 to the towing vehicle 10 does not change when the towing vehicle 10 moves backward at the current steering angle. That is, this case indicates that the towing vehicle 10 and the towed vehicle 12 move backward in the balance state where the coupling angle is maintained. In this case, the towing vehicle 10 and the towed vehicle 12 turn around the same turning center position and move while exhibiting substantially the same behavior. For example, when the towing vehicle 10 moves backward while maintaining the balance state (coupling posture), the towing vehicle 10 and the towed vehicle 12 move while exhibiting behaviors that can be regarded as an integrated vehicle. As a result, the driver can easily grasp the behavior of the towed vehicle 12 and easily move the towed vehicle 12 to, for example, a desired parking space. On the other hand, when the first icon does not overlap the second icon, this case means that the posture of the towed vehicle 12 will change in the future along with the backward moving. That is, when the towing vehicle moves backward, an unbalance state where the coupling angle with the towed vehicle 12 is not maintained is formed. In this case, as the towing vehicle 10 moves backward, the towed vehicle 12 starts to bend (starts to turn) according to the coupling angle at that time, and the coupling angle further increases or decreases with the traction device 18 as a fulcrum. That is, there is a case where the behavior of the towing vehicle 10 does not coincide with the behavior of the towed vehicle 12, and the towed vehicle 12 starts to move in a direction different from a movement direction of the towing vehicle 10. As a result, it is difficult to grasp the movement of the towed vehicle 12, and more advanced steering technique and steering experience are required.

In the present embodiment, the first icon (the first indicator) indicating the current coupling posture of the towed vehicle 12 and the second icon (the second indicator) indicating the future coupling posture of the towed vehicle 12 are displayed in a comparable state. As a result, it is possible to easily grasp the behavior of the towed vehicle 12, that is, a direction of turn in the future, particularly when the towed vehicle 12 is moved backward by the towing vehicle 10. As a result, the towing vehicle 10 that controls the posture of the towed vehicle 12 can be steered more easily.

In the passenger compartment 10b, a display device 34 different from the display device 26 may be provided. As illustrated in FIG. 3, the display device 34 is provided on, for example, an instrument cluster 36 of the dashboard, and is located between a speed display unit 36a and a rotational speed display unit 36b at the approximate center of the instrument cluster 36. A size of a screen 34a of the display device 34 is smaller than a size of the screen 26a of the display device 26. This display device 34 can display, for example, a direction in which the towed vehicle 12 turns with respect to the towing vehicle and a message associated with the turning in a simple manner. The display device 34 can display, for example, an indicator, a mark, and an image representing character information that indicate a future turning direction of the towed vehicle 12 and the like in an auxiliary manner. The amount of information displayed on the display device 34 may be smaller than the amount of information displayed on the display device 26. The display device 34 is, for example, an LCD, an OELD, or the like. The information displayed on the display device 34 may be displayed on the display device 26.

Figure 4:
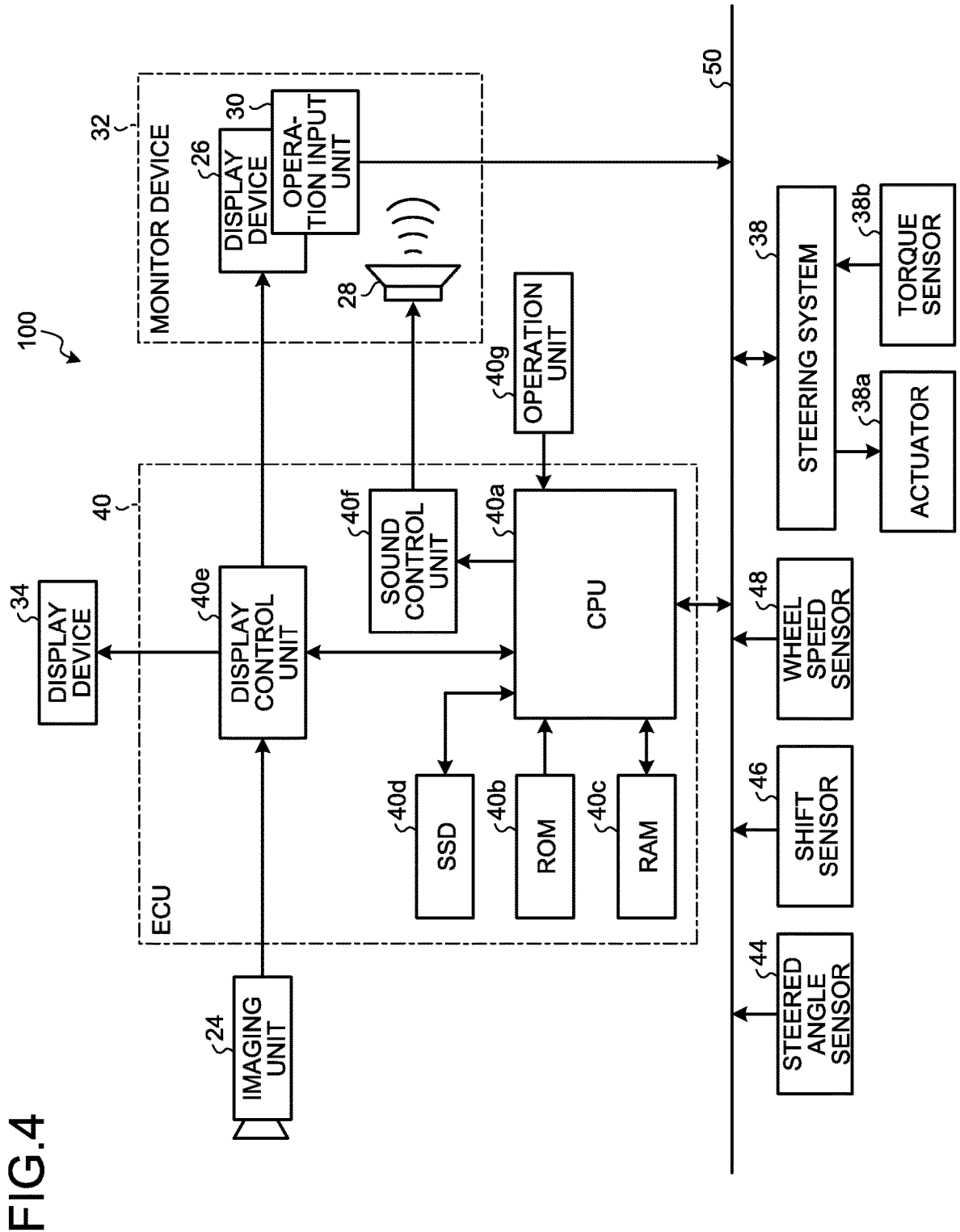
FIG. 4 is an exemplary block diagram of a configuration of a traction assist system including the traction assist apparatus according to the embodiment.

In addition, as illustrated in FIGS. 1 and 2, the towing vehicle 10 may be a four-wheeled vehicle and have two left and right front wheels 14F and two left and right rear wheels 14R. Those four wheels 14 can be configured to be steerable. As illustrated in FIG. 4, the towing vehicle 10 has a steering system 38 that steers at least two wheels 14. The steering system 38 includes an actuator 38a and a torque sensor 38b. The steering system 38 is electrically controlled by an ECU 40 (electronic control unit) or the like to operate the actuator 38a. The steering system 38 is, for example, an electric power steering system, a steer by wire (SBW) system, or the like. The steering system 38 adds a torque being an assist torque to a steering unit 42 (a steering wheel, see FIG. 3) by the actuator 38a to compensate for a steering force, or steers the wheel 14 by the actuator 38a. In this case, the actuator 38a may steer one wheel 14 or may steer a plurality of wheels 14. In addition, the torque sensor 38b also detects, for example, the torque that is applied to the steering unit 42 by the driver.

In addition, as illustrated in FIG. 4, not only the ECU 40, the monitor device 32, the steering system 38 but also a steered angle sensor 44, a shift sensor 46, a wheel speed sensor 48, and the like are electrically coupled via an in-vehicle network 50 serving as an electric communication line in a traction assist system 100 (a traction assist apparatus). The in-vehicle network 50 is configured, for example, as a controller area network (CAN). The ECU 40 can control the steering system 38 and the like by transmitting a control signal through the in-vehicle network 50. In addition, the ECU 40 can receive detection results of the torque sensor 38b, the steered angle sensor 44, the shift sensor 46, the wheel speed sensor 48, and the like and an operation signal of the operation input unit 30 or the like via the in-vehicle network 50.

The ECU 40 includes, for example, a CPU (central processing unit) 40a, a ROM (read only memory) 40b, a RAM (random access memory) 40c, an SSD (solid state drive; a flash memory) 40d, a display control unit 40e, a sound control unit 40f, and the like. The CPU 40a can execute various types of arithmetic processing such as, for example, image processing that relates to the images displayed on the display devices 26 and 34, detection processing of the coupling state between the towing vehicle 10 and the towed vehicle 12, and display processing of the first icon (first indicator) and the second icon (second indicator) (icon for towed vehicle) based on the detection result thereof. The CPU 40a can read out a program installed and stored in a non-volatile storage device, such as the ROM 40b, and execute the arithmetic processing according to the program. The RAM 40c temporarily stores various types of data to be used in the calculation by the CPU 40a. In addition, the display control unit 40e mainly executes, for example, composition of pieces of image data displayed by the display devices 26 and 34 in the arithmetic processing of the ECU 40. In addition, the sound control unit 40f mainly executes processing of sound data output from the sound output device 28 in the arithmetic processing in the ECU 40. In addition, the SSD 40d is a rewritable non-volatile storage unit, and can store data even when a power supply of the ECU 40 is turned off. The CPU 40a, the ROM 40b, the RAM 40c, and the like can be integrated inside the same package.

In addition, the ECU 40 may have a configuration in which another logical operation processor such as a digital signal processor (DSP), a logic circuit, or the like is used instead of the CPU 40*a*. In addition, a hard disk drive (HDD) may be provided instead of the SSD 40*d*, and the SSD 40*d* and the HDD may be provided separately from the ECU 40.

The steered angle sensor 44 is, for example, a sensor that detects a steering amount of the steering unit 42 such as a steering wheel (a steered angle of the towing vehicle 10). The steered angle sensor 44 is configured by using, for example, a Hall element or the like. The ECU 40 acquires the steering amount of the steering unit 42 applied by the driver, the steering amount of each of the wheels 14 during automatic steering, and the like from the steered angle sensor 44 and executes various types of control. The steered angle sensor 44 detects a rotation angle of a rotating portion included in the steering unit 42. The steered angle sensor 44 is an example of an angle sensor.

The shift sensor 46 is, for example, a sensor that detects a position of a movable portion of a speed-change operation unit 52 (a shift lever, see FIG. 3). The shift sensor 46 can detect a position of a lever, an arm, a button, or the like as the movable portion. The shift sensor 46 may include a displacement sensor or may be configured as a switch.

The wheel speed sensor 48 is a sensor that detects the amount of rotation and the number of rotations per unit time of the wheel 14. The wheel speed sensor 48 is arranged at each of the wheels 14 and outputs a wheel speed pulse number indicating the number of rotations detected by each of the wheels 14 as a sensor value. The wheel speed sensor 48 can be configured, for example, by using a Hall element or the like. The ECU 40 calculates the amount of movement of the towing vehicle 10 or the like based on the sensor value acquired from the wheel speed sensor 48, and executes various types of control. When the CPU 40*a* calculates the vehicle speed of the towing vehicle 10 based on each sensor value of the wheel speed sensors 48, the CPU 40*a* determines the vehicle speed of the towing vehicle 10 based on the speed of the wheel 14 having the smallest sensor value among the four wheels and executes various types of control. In addition, when the wheel 14 having a larger sensor value than the other wheels 14 among the four wheels is present, for example, when there is the wheel 14 having the number of rotations per unit period (unit time or unit distance) that is greater than those of the other wheels 14 by a predetermined number or more, the CPU 40*a* recognizes that the corresponding wheel 14 is in a slip state (idle state) and executes various types of control. There is also a case where the wheel speed sensor 48 is provided in a brake system (not illustrated). In such a case, the CPU 40*a* may acquire the detection result of the wheel speed sensor 48 via the brake system.

The configurations, arrangements, electrical coupling modes, and the like of the various sensors and actuator described above are merely examples, and can be set (changed) in various manners.

Figure 5:
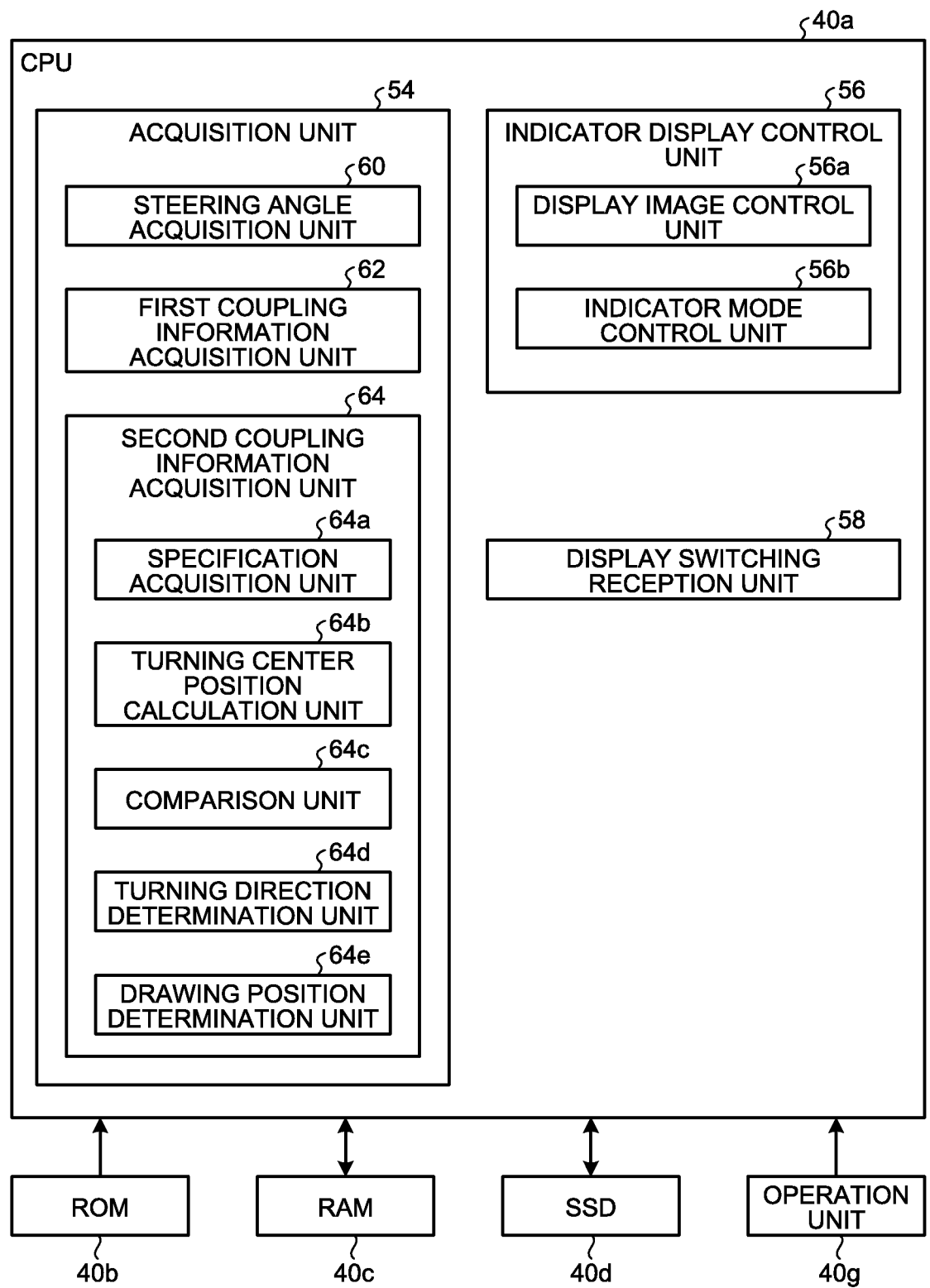
FIG. 5 is an exemplary block diagram of a configuration of a CPU of the traction assist apparatus according to the embodiment.

The CPU 40*a* included in the ECU 40 includes various modules that implement the display processing to display the first icon indicating the current coupling posture of the towed vehicle 12 indicated by the first indicator and the second icon indicating the future coupling posture of the towed vehicle 12 indicated by the second indicator in a comparable state. The various modules are implemented by that the CPU 40*a* reads out a program installed and stored in a storage device, such as the ROM 40*b*, and executes the program. The CPU 40*a* includes, as illustrated in FIG. 5, modules such as an acquisition unit 54, an indicator display control unit 56 (control unit), and a display switching reception unit 58.

The acquisition unit 54 includes a steering angle acquisition unit 60, a first coupling information acquisition unit 62, a second coupling information acquisition unit 64, and the like. The steering angle acquisition unit 60 uses conversion information (for example, a conversion map) between a steered angle and the steering angle stored in the ROM 40*b* or the like, for example, to acquire a current first steering angle (an angle to a neutral position of the steering unit 42) of the towing vehicle 10 is acquired from the current steered angle of the towing vehicle 10 acquired by the steered angle sensor 44. In another embodiment, the steering angle acquisition unit 60 can also acquire a second steering angle in a case where the towing vehicle 10 turns with the towed vehicle turning center position when the towed vehicle 12 moves backward with the current coupling angle as a turning center. The use of the second steering angle will be described later.

The first coupling information acquisition unit 62 acquires a first coupling angle indicating a current coupling posture of the towed vehicle 12 to the towing vehicle 10. The first coupling information acquisition unit 62 acquires the coupling angle (coupling posture) of the towed vehicle 12 by analyzing the captured image data imaged by the imaging unit 24. The image based on the captured image data imaged by the imaging unit 24 includes, for example, the rear bumper 16 of the towing vehicle 10, the traction device 18, the coupling member 20, and part of the distal end of the towed vehicle 12 as described above. The traction device 18 is generally fixed on a center axis in a front-rear direction of the towing vehicle 10 (a central portion in the vehicle width direction) in order that the towed vehicle 12 may follow the towing vehicle 10 straight when the towing vehicle 10 moves straight forward, for example. Therefore, the first coupling information acquisition unit 62 can acquire the first coupling angle by extracting the coupling member coupled to the traction device 18 on the captured image and detecting an inclination of the coupling member 20 with respect to the center axis. When the towing vehicle 10 includes an angle sensor or the like that detects the coupling state (a coupling angle) between the traction device 18 and the coupling member 20, the first coupling angle may be acquired based on a detection result of the angle sensor. In this case, image processing to acquire the first coupling angle is omitted, and a processing load on the CPU 40*a* can be reduced.

The second coupling information acquisition unit 64 includes a specification acquisition unit 64*a*, a turning center position calculation unit 64*b*, a comparison unit 64*c*, a turning direction determination unit 64*d*, a drawing position determination unit 64*e*, and the like as modules configured to acquire a second coupling angle indicating a future coupling posture of the towed vehicle 12 (for example, after backward movement by 1 m) where the towing vehicle 10 moves backward at a current steering angle.

Figure 6:
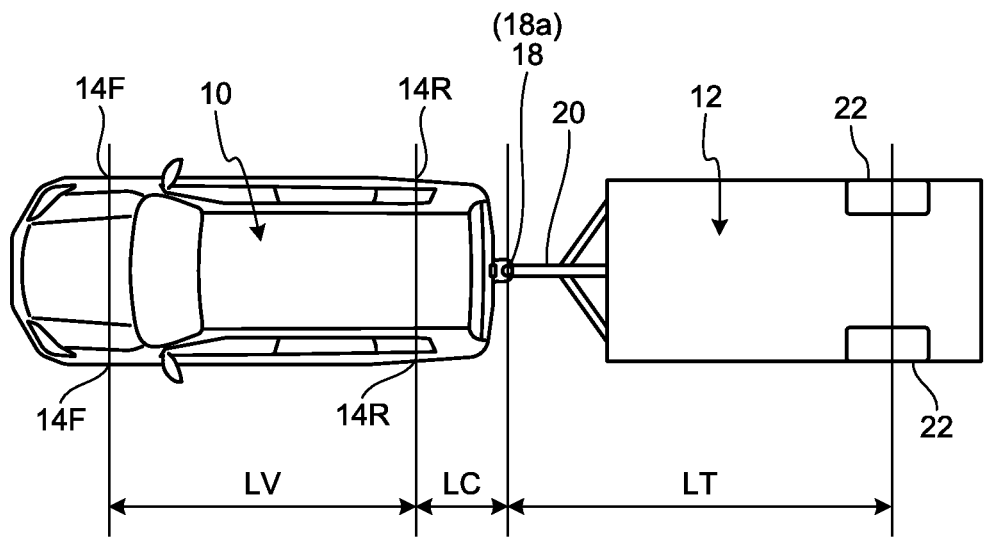
FIG. 6 is a top view for describing various specifications of the towing vehicle and the towed vehicle.

The specification acquisition unit 64*a* acquires a wheelbase length LV of the towing vehicle 10 used to calculate the turning center position of the towing vehicle 10 and a wheelbase length LT (see FIG. 6) of the towed vehicle 12 used to calculate the turning center position of the towed vehicle 12. The wheelbase length LV of the towing vehicle is a distance between axles of the front wheel 14F and the rear wheel 14R of the towing vehicle 10. The wheelbase length LV of the towing vehicle 10 is a known value that can be acquired from the specification or the like of the towing vehicle 10. In addition, the wheelbase length LT of the towed vehicle 12 is a length from the traction device 18 to an axle of the trailer wheel 22 of the towed vehicle 12 including the coupling member 20. However, the towed vehicle 12 of various specifications can be coupled to the towing vehicle 10, and the wheelbase length LT differs depending on the specification of the towed vehicle 12. The specification acquisition unit 64a can acquire the wheelbase length LT directly input by the driver or the like using the operation input unit 30 of the monitor device 32 based on the specification or the like of the towed vehicle 12 to be coupled. In addition, the specification acquisition unit 64a also acquires a hitch distance LC from an axle position of the rear wheel 14R to the traction device 18 illustrated in FIG. 6.

Figure 7:
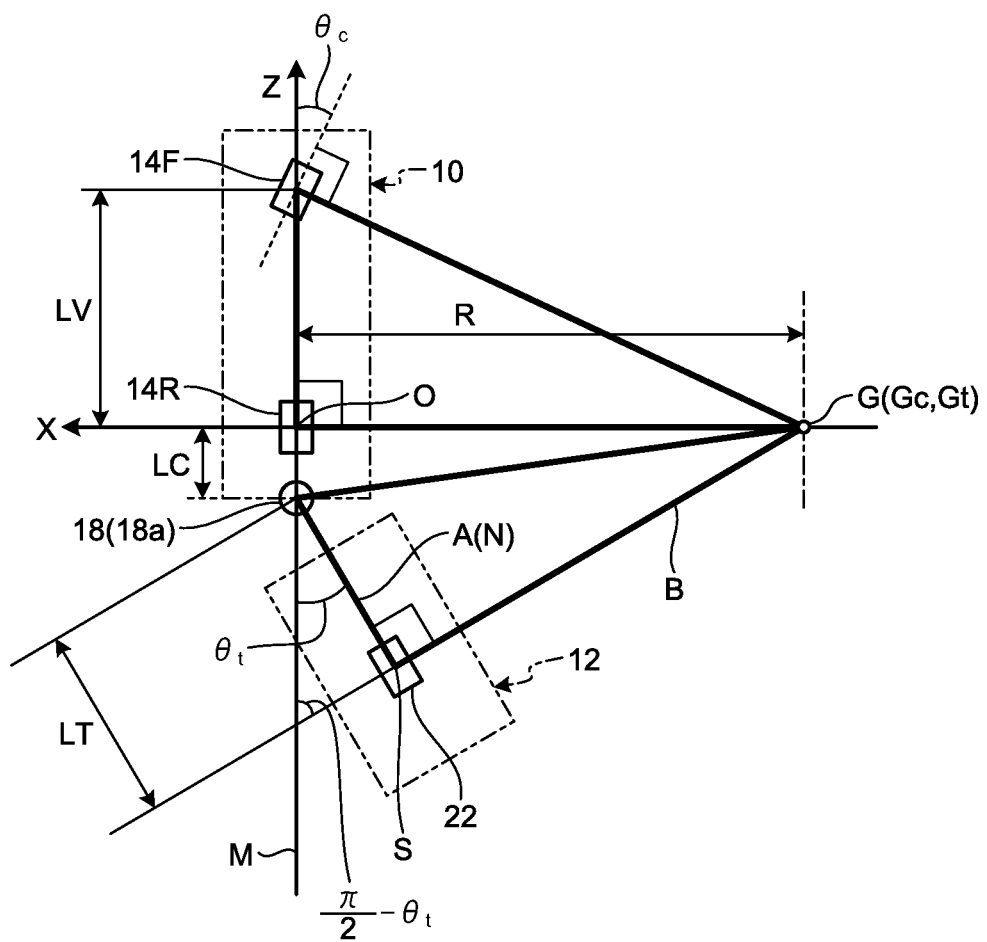
FIG. 7 is a diagram for describing an example of calculating a length of a wheelbase of the towed vehicle and an example of calculating turning center positions of a towing vehicle 10 and a towed vehicle 12 in the traction assist apparatus according to the embodiment.

The turning center position calculation unit 64b calculates a towing vehicle turning center position where the towing vehicle 10 turns based on the specification (wheelbase length LV) of the towing vehicle 10 acquired by the specification acquisition unit 64a and the steering angle (steered angle) of the towing vehicle 10 acquired by the steering angle acquisition unit 60. In addition, the turning center position calculation unit 64b calculates a towed vehicle turning center position where the towed vehicle 12 turns based on the specification (wheelbase length LT) of the towed vehicle 12 acquired by the specification acquisition unit 64a and the first coupling angle between the towing vehicle 10 and the towed vehicle 12 acquired by the first coupling information acquisition unit 62. FIG. 7 is a schematic view for describing a calculation example of the turning center positions of the towing vehicle 10 and the towed vehicle 12, and is a diagram for describing a case where the towing vehicle 10 moves while towing the towed vehicle 12 with a turning center position G as a center and a turning radius R of the rear wheel 14R of the towing vehicle on X-Z coordinates. In FIG. 7, for the sake of simplification, the front wheel 14F and the rear wheel 14R of the towing vehicle 10 and the trailer wheel 22 of the towed vehicle 12 are explained by using a model in which those wheels are present at the center in the vehicle width direction, that is, on the center axis extending in the vehicle front-rear direction (the front wheel 14F and the rear wheel 14R are present on a vehicle center axis M and the trailer wheel 22 is present on a coupling center axis N).

The turning center position calculation unit 64b can calculate coordinates of the front wheel 14F of the towing vehicle 10 with the rear wheel 14R (an origin O) of the towing vehicle 10 as a reference based on the wheelbase length LV of the towing vehicle 10. Then, a point where an extension line of the axle of the front wheel 14F intersects an extension line (an X axis) of the axle of the rear wheel 14R is calculated, as a towing vehicle turning center position Gc of the towing vehicle 10 at a steering angle (a steered angle) θc, based on a steering angle (a steered angle) θc (the first steering angle) of the current towing vehicle 10. On the other hand, coordinates of the traction device 18 with the rear wheel 14R (the origin O) of the towing vehicle 10 as a reference can be calculated based on the hitch distance LC acquired by the specification acquisition unit 64a. The towed vehicle 12 swings (turns) around the traction device 18. At this time, the coordinates of the trailer wheel 22 exist at the position of the wheelbase length LT of the towed vehicle 12 in a direction of a current coupling angle θt of the towed vehicle 12 to the towing vehicle 10 acquired by the first coupling information acquisition unit 62. Then, the turning center position calculation unit 64b calculates a point on the extension line of the axle of the trailer wheel 22 intersecting with the extension line (the X axis) of the axle of the rear wheel 14R of the towing vehicle 10 as a towed vehicle turning center position Gt where the towed vehicle 12 is coupled (towed) to the towing vehicle 10 at a coupling angle θt and turns. The case of FIG. 7 illustrates a case where the towing vehicle 10 and the towed vehicle 12 are in the balance state and the turning center positions G (Gc and Gt) are at the same position.

In another embodiment, the specification acquisition unit 64a may estimate the wheelbase length LT of the towed vehicle 12 when the towing vehicle 10 tows the towed vehicle 12 to turn and move forward. As illustrated in FIG. 7, for example, when the towing vehicle 10 turns and moves forward while towing the towed vehicle 12, the towed vehicle 12 is driven by the towing vehicle 10 and the towing vehicle 10 and the towed vehicle 12 turn around substantially the same turning center position G. That is, the towing vehicle 10 and the towed vehicle 12 travel in the balance state. In this case, the towing vehicle turning center position Gc can be calculated as described above. Similarly, the towed vehicle turning center position Gt can also be calculated. In other words, when the towing vehicle 10 and the towed vehicle 12 are in the balance state at the coupling angle θt and the turning center position G in the balance state has been calculated, the wheelbase length LT of the towed vehicle 12 can be calculated backward. For example, when the towed vehicle 12 is turning around the turning center position G in the balance state, the axle of the trailer wheel 22 of the towed vehicle 12 exists at a position where a straight line B passing through the turning center position G is perpendicular to a straight line A passing through the coupling center axis N (the center axis of the towed vehicle 12). Therefore, first, information (for example, a formula of the straight line A) indicating the straight line A, which passes through the traction device 18 and has an inclination of the coupling angle θt, is acquired on FIG. 7. In addition, the turning center position G (coordinates of Gc) is acquired from the steering angle (a steered angle) θc of the towing vehicle 10 and the wheelbase length LV. Information (for example, a formula of the straight line B) indicating the straight line B, which passes through this turning center position G (Gc) and has an inclination of $(\pi/2)-\theta t$, is acquired, and information (coordinates of the trailer wheel 22) on an intersection point S of the straight line A and the straight line B is acquired. As a result, it is possible to estimate a length of the wheelbase length LT of the towed vehicle 12 based on coordinates of the traction device 18 and coordinates of the intersection point S.

The comparison unit 64c compares the towed vehicle turning center position Gt and the towing vehicle turning center position Gc acquired by the turning center position calculation unit 64b, and detects whether the coupling state between the towing vehicle 10 and the towed vehicle 12 is the balance state. That is, when moving backward with the current steering angle (a steered angle) θc, it is determined whether the towing vehicle 10 and the towed vehicle 12 move backward while maintaining the current coupling angle θt (backward movement in the balance state) or move backward with the current coupling angle θt collapsing (backward movement in an unbalance state). When a difference between the towed vehicle turning center position Gt and the towing vehicle turning center position Gc is a predetermined threshold m or less, the comparison unit 64c can regard that the turning center position G is substantially the same, and regards that the towed vehicle 12 moves backward without changing the coupling posture while maintaining the balance state even when the towing vehicle 10 moves to perform backward traction so as to push back the towed vehicle 12. On the other hand, when the difference between the towed vehicle turning center position Gt and the towing vehicle turning center position Gc is greater than the predetermined threshold m, the comparison unit 64c regards that the turning center positions G of the towing vehicle 10 and the towed vehicle 12 are different, the unbalance state is formed when the towing vehicle 10 moves to perform backward traction so as to push back the towed vehicle 12, and the towed vehicle 12 moves backward while changing the coupling posture.

Figure 8:
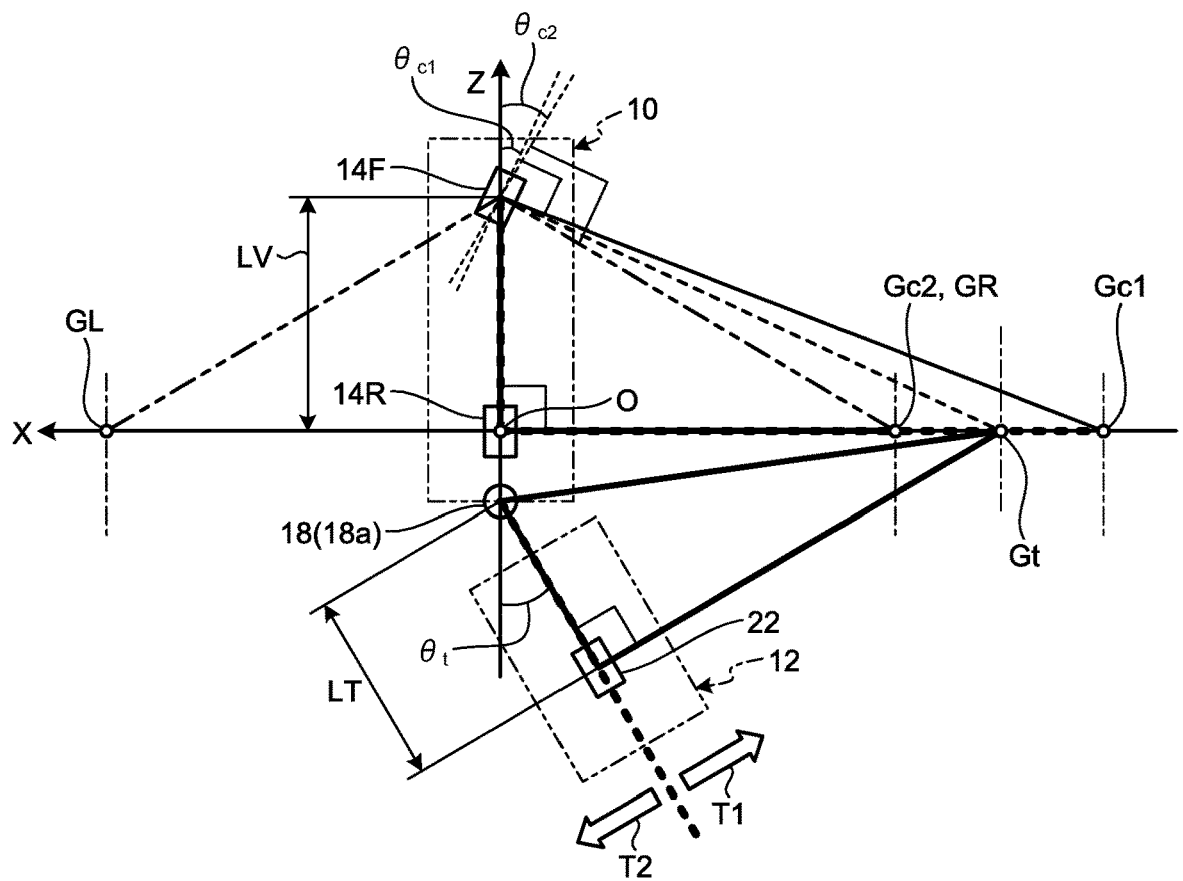
FIG. 8 is a schematic view for describing determination of a drawing position of a second indicator based on a relationship between a towed vehicle turning center position and a towing vehicle turning center position in the traction assist apparatus according to the embodiment.

When there is the difference between the towed vehicle turning center position Gt and the towing vehicle turning center position Gc as a result of the comparison of the comparison unit 64c, the turning direction determination unit 64d determines a direction of left or right, to which the future position of the towed vehicle 12 will move (turn) from the current position (position corresponding to the coupling angle θt) of the towed vehicle 12 by the backward moving of the towing vehicle 10. For example, as illustrated in FIG. 8, when the current steering angle (a steered angle) of the towing vehicle 10 is a steering angle θc1 to the towed vehicle turning center position Gt at the current coupling angle θt of the towed vehicle 12 calculated by the turning center position calculation unit 64b, it is assumed that a towing vehicle turning center position Gc1 of the towing vehicle 10 is shifted to the right on the extension line (X axis) of the axle of the rear wheel 14R. In this case, when the towing vehicle 10 moves the towed vehicle 12 backward at the current steering angle θc1, the towed vehicle 12 moves (turns) backward with a smaller turning radius smaller than the towing vehicle 10. That is, when the towing vehicle 10 moves backward at the current steering angle θc1, the towed vehicle 12 turns in the future while changing in an angle increasing direction T1 with respect to the current coupling angle θt. That is, the coupling posture of the towed vehicle 12 to the towing vehicle 10 changes in a direction that bends deeper. On the other hand, when the current steering angle (steered angle) of the towing vehicle 10 is a steering angle θc2 to the towed vehicle turning center position Gt, it is assumed that a towing vehicle turning center position Gc2 of the towing vehicle 10 is shifted to the left on the extension line (X axis) of the axle of the rear wheel 14R. In this case, when the towing vehicle 10 moves the towed vehicle 12 backward at the current steering angle θc2, the towed vehicle 12 moves (turns) backward with a larger turning radius smaller than the towing vehicle 10. That is, when the towing vehicle 10 moves backward at the current steering angle θc2, the towed vehicle 12 turns in the future while changing in an angle decreasing direction T2 with respect to the current coupling angle θt. That is, the coupling posture of the towed vehicle 12 to the towing vehicle 10 changes in a direction that bends shallowly or in a direction to bend in the opposite direction across the center axis of the towing vehicle 10 in the front-rear direction.

When the turning direction determination unit 64d determines a future turning direction of the towed vehicle 12, the drawing position determination unit 64e determines a drawing position used at the time of actually drawing the second icon indicating the future coupling posture of the towed vehicle 12 on the display device 26. The drawing position determination unit 64e determines the drawing position of the second icon relative to the current position of the towed vehicle 12 (a drawing position of the first icon), for example, based on the magnitude of the difference between the towed vehicle turning center position Gt and the towing vehicle turning center position Gc. In this case, the drawing position determination unit 64e determines the drawing position using, for example, a "conversion coefficient α" stored in the SSD 40d or the like. For example, when the difference between the towing vehicle turning center position Gc and the towed vehicle turning center position Gt is x, the second icon is drawn at a position turned around the traction device 18 by an angle of α×x° from the current position of the towed vehicle 12 (the position of the first icon). The drawing position determination unit 64e can use another conversion method instead of the conversion coefficient α. For example, the drawing position may be determined using conversion information (for example, a conversion map) indicating a relationship between the difference x between the turning center positions G and the drawing position. The conversion information such as the conversion coefficient α and the conversion map can be determined in advance by a test or the like.

In order to execute control relating to display of indicators such as the first icon and the second icon, the indicator display control unit 56 includes a display image control unit 56a and an indicator mode control unit 56b. The display image control unit 56a switches the screen 26a of the display device 26 between a normal monitoring mode and a traction assist mode. For example, when display in the traction assist mode is requested by the driver and the first icon and the second icon can be drawn with sufficient drawing accuracy, a dedicated display region is formed on the screen 26a such that the first icon and the second icon can be easily viewed. The visibility of the first icon and the second icon is improved by, for example, preparing a display region whose background color is black. On the other hand, when the display in the traction assist mode is unnecessary or when the display accuracy of the first icon and the second icon is not sufficient, the dedicated display region (black background region or the like) is not displayed, and the display is switched to display in the normal monitoring mode in which a state around the towing vehicle 10 can be easily grasped, thereby improving the visibility.

Figure 9:
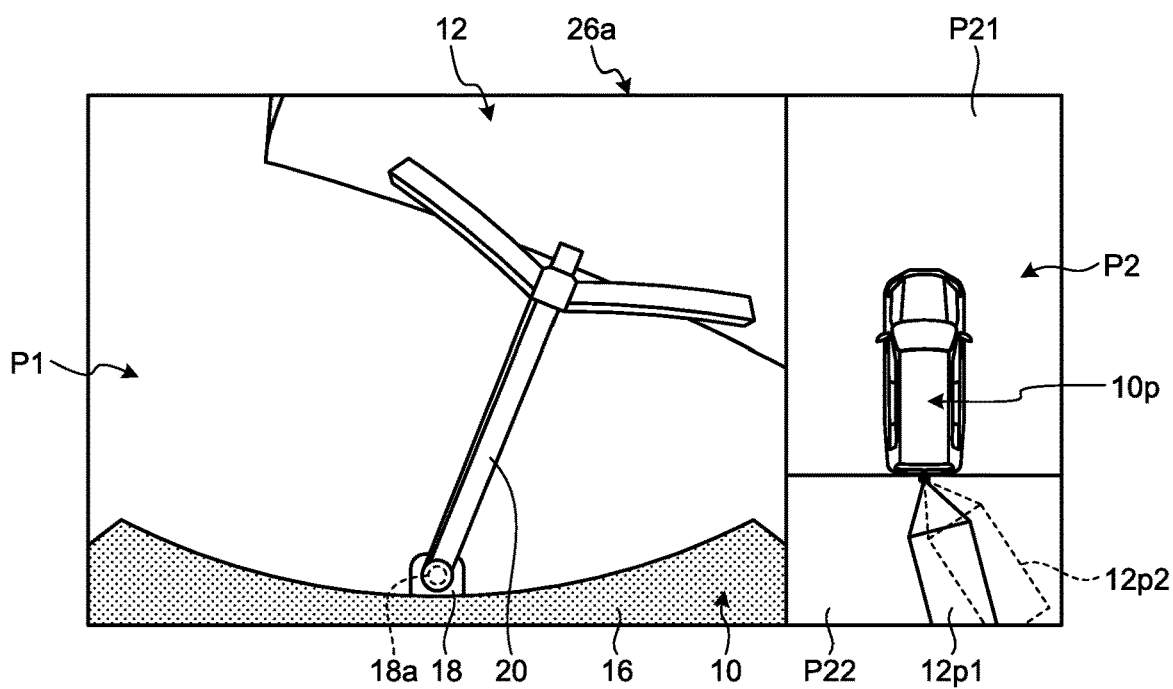
FIG. 9 is a diagram illustrating an example of a screen when a real image of the towed vehicle imaged by an imaging unit of the traction assist system including the traction assist apparatus according to the embodiment and bird's-eye view images of the towing vehicle and the towed vehicle indicated by indicators (icons) are displayed in parallel on a display device.

FIG. 9 is an example of the screen 26a (screen of the traction assist mode) of the display device 26 controlled by the indicator display control unit 56, and is an example in which a real image P1 and a bird's-eye view image P2 are displayed in parallel. The real image P1 represents the towed vehicle 12 (a downward view image of the coupling member 20) imaged by the imaging unit 24. The bird's-eye view image P2 represents a third icon 10p indicating the towing vehicle 10 in a bird's-eye view, a first icon 12p1 indicating the towed vehicle 12 in the bird's-eye view, and a second icon 12p2. The display image control unit 56a switches between the normal monitoring mode and the traction assist mode for the real image P1 and the bird's-eye view image P2.

The real image P1 in the normal monitoring mode displays, for example, a front image or a side image based on the captured image data imaged by the imaging unit arranged in front or at side of the towing vehicle 10. The real image P1 in the normal monitoring mode provides the state (presence or absence of an obstacle, a course prediction line, or the like) around the towing vehicle 10 to the driver (the user). The real image P1 in the traction assist mode is an image including part of the rear bumper 16 of the towing vehicle 10 that can be imaged by the imaging unit 24, the traction device 18, the coupling member 20, the distal end portion of the towed vehicle 12, and the like as illustrated in FIG. 9. The real image P1 in the traction assist mode provides the current coupling state of the towed vehicle 12 that is difficult to see from driver's seat to the driver.

The bird's-eye view image P2 in the normal monitoring mode is an image of the towing vehicle 10 in a bird's-eye view, for example. The bird's-eye view image P2 in the normal monitoring mode displays only a first bird's-eye view region P21 displaying the third icon 10p (a third indicator, a towing vehicle image) that is the bird's-eye view image corresponding to the towing vehicle 10 out of the bird's-eye view image P2 illustrated in FIG. 9. In this case, when there are an obstacle and another vehicle around the third icon 10p, images and icons indicating them are displayed, and an image that allows easy understanding of the relative relationship with the towing vehicle 10 (third icon 10p) is provided to the user. In addition to the first bird's-eye view region P21 displaying the third icon 10p, the bird's-eye view image P2 in the traction assist mode displays a second bird's-eye view region P22 displaying the first icon 12p1 (the first indicator, the towed vehicle image) and the second icon 12p2 (the second indicator, the towed vehicle image) corresponding to the towed vehicle 12 as illustrated in FIG. 9. The second bird's-eye view region P22 is a region schematically illustrating the coupling angle θt (coupling posture) of the towed vehicle 12 to the towing vehicle 10. The second bird's-eye view region P22 displays, for example, the first icon 12p1 (for example, a white icon) indicating the current coupling posture (first coupling information) of the towed vehicle 12 and the second icon 12p2 (for example, a yellow icon) indicating the future coupling posture (second coupling information) of the towed vehicle 12 on a black background. Since the first icon 12p1 and the second icon 12p2 are displayed in the second bird's-eye view region P22 having the different background from the first bird's-eye view region P21 representing the third icon 10p that is the towing vehicle image in this manner, the display of the first icon 12p1 and the second icon 12p2 is made conspicuous, which can contribute to the improvement of visibility. In addition, as the second bird's-eye view region P22 is not displayed during the normal monitoring mode, it is easy for the user to intuitively understand that the screen is in the normal monitoring mode. It is sufficient for the second bird's-eye view region P22 to be distinguishable from the first bird's-eye view region P21, and the background color can be set as appropriate.

The indicator mode control unit 56b performs display control of the first icon 12p1, the second icon 12p2, and the third icon 10p. The indicator mode control unit 56b reads out the third icon 10p (a towing vehicle image) depicting a bird's-eye view shape of the towing vehicle 10 stored in advance in the ROM 40b or the SSD 40d and displays the read third icon 10p in the first bird's-eye view region P21. Similarly, the indicator mode control unit 56b reads out the first icon 12p1 indicating a bird's-eye view shape of the towed vehicle 12 and the second icon 12p2 (a towed vehicle image) stored in advance in the ROM 40b or the SSD 40d, and displays the read first icon 12p1 and second icon 12p2 in the second bird's-eye view region P22. The various towed vehicles 12 can be coupled to the towing vehicle 10 as described above, so that the first icon 12p1 and the second icon 12p2 are formed with icons having simple line drawings in the present embodiment. In another embodiment, an icon having a more detailed shape may be used similarly to the third icon 10p. In addition, the indicator mode control unit 56b changes a display mode of the second icon 12p2 in accordance with magnitude of the difference between the first coupling information (a coupling posture of the first icon 12p1) representing the current coupling posture of the towed vehicle 12 and the second coupling information (a coupling posture of the second icon 12p2) representing the future coupling posture of the towed vehicle 12. For example, when the second icon 12p2 is inclined by a predetermined maximum angle or more with respect to the first icon 12p1, the second icon 12p2 is displayed in a highlighted manner. The highlighted display is a display mode that is different from a normal display mode of the second icon 12p2 (for example, yellow lighting display), and red display or blinking display can be used, for example.

The predetermined maximum angle (the maximum coupling angle) is determined by structures, wheelbase lengths, specifications, and the like of the towing vehicle 10 and the towed vehicle 12, and is different for each vehicle type. There is a "jackknife state" in which a coupling angle of the towed vehicle 12 to the towing vehicle 10 is greatly bent and the coupling angle cannot be corrected no matter how the steering angle of the towing vehicle 10 is changed during the backward moving. It is possible to determine whether the "jackknife state" occurs based on a relationship between a minimum towing vehicle turning center position of the towing vehicle 10 determined by the specification of the towing vehicle 10 and the towed vehicle turning center position of the towed vehicle 12. Specifically, a towing vehicle right turning center position GR based on a maximum right steering angle of the towing vehicle 10 defined by using the current position of the towing vehicle 10 as a center and a towing vehicle left turning center position GL based on a maximum left steering angle are determined on the extension line of the axle of the rear wheel of the towing vehicle 10 by the specification of the towing vehicle 10. Then, when a towed vehicle turning center position Gt of the towed vehicle 12 based on the first coupling information exists between the towing vehicle right turning center position GR and the towing vehicle left turning center position GL, that is, when GL<Gt<GR, the indicator mode control unit 56b determines that the "jackknife state" occurs. For example, with reference to FIG. 8, the towing vehicle right turning center position GR at the maximum right steering angle determined based on the specification of the towing vehicle is assumed as the towing vehicle turning center position Gc2 in FIG. 8. In addition, the towing vehicle left turning center position based on the maximum left steering angle of the towing vehicle 10 is assumed as the towing vehicle left turning center position GL. In FIG. 8, the towed vehicle turning center position Gt of the towed vehicle 12 does not satisfy the condition of GL<Gt<GR (GR<Gt), so that the indicator mode control unit 56b determines that the "jackknife state" does not occur at the current stage, and the indicator mode control unit 56b does not execute the highlighted display. On the other hand, when the towed vehicle turning center position Gt exists between the towing vehicle right turning center position GR and the towing vehicle left turning center position GL, that is, when the condition of GL<Gt<GR is satisfied, the indicator mode control unit 56b determines that the "jackknife state" occurs at the current stage, and the indicator mode control unit 56b executes the highlighted display. The towing vehicle right turning center position GR and the towing vehicle left turning center position GL can be acquired when, for example, the specification acquisition unit 64a acquires each specification of the towing vehicle 10 and the towed vehicle 12.

In addition, when the inclination of the second icon 12p2 to the first icon 12p1 is a predetermined minimum value or less, for example, when the first icon 12p1 and the second icon 12p2 almost overlap each other and the towing vehicle 10 and the towed vehicle 12 are in the balance state, the indicator mode control unit 56b can hide the second icon 12p2. In this case, the second icon 12p2 may overlap the first icon 12p1 so as not to be substantially visible, or may be deleted from the image. In another embodiment, it is sufficient that the first icon 12*p*1 and the second icon 12*p*2 can notify that the towing vehicle 10 and the towed vehicle 12 are substantially balanced and those vehicles exhibit the same behavior during the backward moving. Thus, it is unnecessary for the first icon 12*p*1 and the second icon 12*p*2 to completely overlap each other even in the balance state.

The display switching reception unit 58 receives a request for shifting to the traction assist mode from the user via an operation unit 40*g* or the like. When the towing vehicle 10 that tows the towed vehicle 12 moves forward, the towed vehicle 12 is almost driven in the balance state with the towing vehicle 10, and the towing vehicle 10 and the towed vehicle 12 exhibit substantially the same behavior as described above. Thus, the need for traction assist is low during the forward moving. Therefore, switching to the traction assist mode may be received by the display switching reception unit 58 other than the time of forward moving, that is, under one display switching condition that the speed-change operation unit 52 (shift lever) is not shifted to a forward moving "D" range.

According to the traction assist apparatus of the present embodiment, the drawing position of the second icon 12*p*2 indicating the coupling posture of the towed vehicle 12 in the future (for example, after backward moving by 1 m) changes with respect to the drawing position of the first icon 12*p*1 indicating the current coupling posture of the towed vehicle 12. As a result, when the towing vehicle 10 is moved backward, it is easy to allow the driver to intuitively recognize a direction in which the towed vehicle 12 will turn in the future and how much the towed vehicle 12 will turn (how much the towed vehicle 12 will bend using the traction device 18 as a fulcrum). In addition, the drawing position of the second icon 12*p*2 can be changed in accordance with the steering angle (a steered angle) θc of the towing vehicle 10 to the drawing position of the first icon 12*p*1. Therefore, when the towing vehicle 10 is steered to move backward, it is possible to foresee which direction and how match the towed vehicle 12 will turn in the future. Thus, it is possible to reduce a steering burden when the towing vehicle 10 (the towed vehicle 12) is moved backward. Furthermore, the second icon 12*p*2 displays a future movement position obtained by steering the steering unit 42 in a state where the towing vehicle 10 is stopped. Thus, it is possible to simulate the movement of the towed vehicle 12 before the towing vehicle 10 (the towed vehicle 12) starts to move so that it is possible to reduce occurrence of a steering error.

Figure 10:
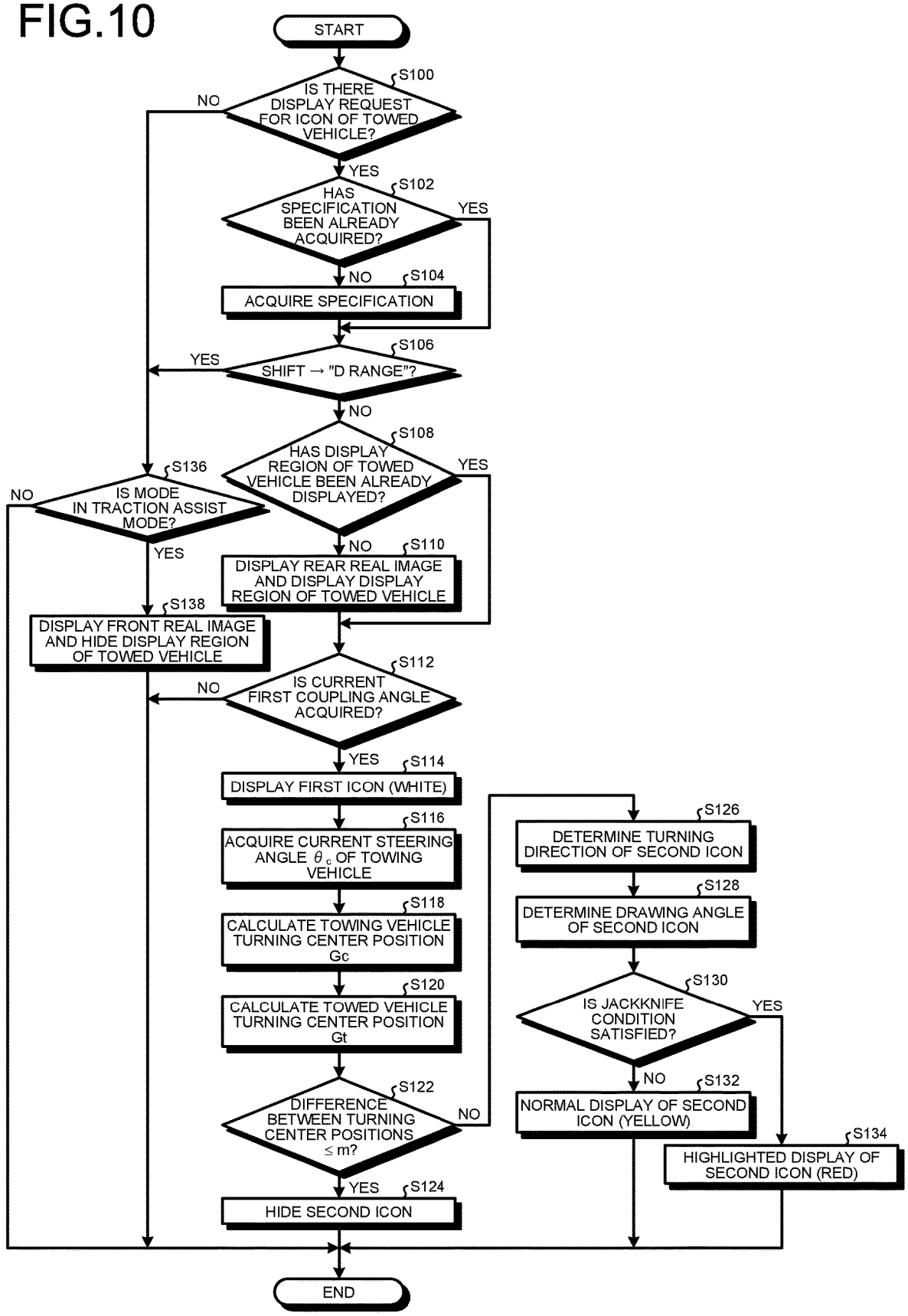
FIG. 10 is a flowchart for describing an example of a procedure of an indicator display process performed by the traction assist apparatus according to the embodiment.
Figure 11:
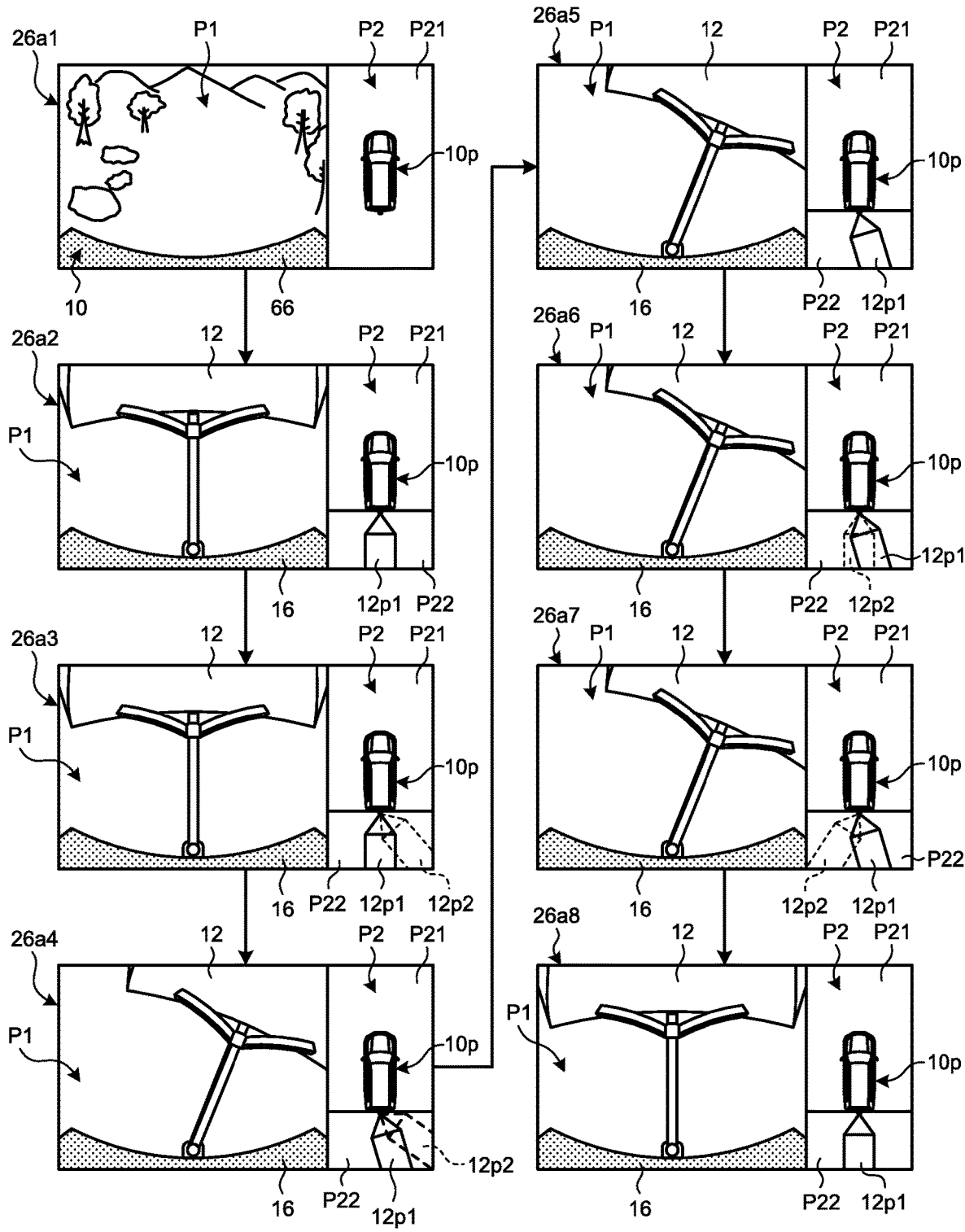
FIG. 11 is a diagram illustrating changes of a display image in the traction assist apparatus according to the embodiment.

Details of a traction assist process performed by the traction assist apparatus (traction assist system 100) configured as described above will be described based on the flowchart of FIG. 10. The flowchart illustrated in FIG. 10 is repeatedly executed at a predetermined control period. FIG. 11 is a diagram illustrating examples of changes of the screen 26*a* of the display device 26 when the traction assist process is executed.

Prior to switching to the traction assist mode, that is, in the normal monitoring mode, the screen 26*a* of the display device 26 displays part of a front bumper 66 of the towing vehicle 10 and a state in front of this part (a front image) as the real image P1, as illustrated in a screen 26*a*1 in FIG. 11. The front image can be displayed by using an image captured by an imaging unit provided at a front portion of the towing vehicle 10, for example. In addition, the first bird's-eye view region P21 representing only the third icon 10*p* (towing vehicle image) of the towing vehicle 10 in the bird's-eye view is displayed as the bird's-eye view image P2.

In the above state, the display switching reception unit 58 confirms whether the display in the traction assist mode, that is, whether a display request of an icon of the towed vehicle 12 has been made (S100). When the display request for "traction assist mode" is made via the operation unit 40*g* or the operation input unit 30 (Yes in S100), it is confirmed whether the specification acquisition unit 64*a* has already acquired the specifications of the towing vehicle 10 and the towed vehicle 12 (S102). When the specification acquisition unit 64*a* has not acquired the respective specifications (No in S102), display to prompt the input of the specifications of the towing vehicle 10 and the towed vehicle 12 to the specification acquisition unit 64*a*, the display device 26, or the like is performed, and the respective specifications of the towing vehicle 10 and the towed vehicle 12 are acquired (S104). When the specification acquisition unit 64*a* has already acquired the respective specifications (Yes in S102), the process of S104 is skipped. Subsequently, the display switching reception unit 58 confirms whether the speed-change operation unit 52 (a shift lever) is in the forward moving range (a "D" range) (S106). When the speed-change operation unit 52 is not in the D range (No in S106), the display image control unit 56*a* confirms whether the display region (the second bird's-eye view region P22) of the first icon 12*p*1 and the second icon 12*p*2 indicating the towed vehicle 12 has already been displayed (S108). That is, when the second bird's-eye view region P22 has not been displayed (No in S108), the display image control unit 56*a* switches the display of the real image P1 to a rear image in which the rear bumper 16 and the towed vehicle 12 are displayed as illustrated in a screen 26*a*2 in FIG. 11, and displays the second bird's-eye view region P22 (S110). When the second bird's-eye view region P22 has already been displayed (Yes in S108), the process of S110 is skipped.

Subsequently, when the coupling angle θt (first coupling angle) indicating the current coupling state between the towing vehicle 10 and the towed vehicle 12 can be acquired in the first coupling information acquisition unit 62 (Yes in S112), the indicator mode control unit 56*b* displays the first icon 12*p*1 based on the current coupling angle θt acquired by the first coupling information acquisition unit 62 (S114). In this case, a first icon 12P1 is the icon indicating the current coupling posture of the towed vehicle 12 and is displayed in, for example, a white solid line on the black background of the second bird's-eye view region P22 so as to be coupled at a rear end of the third icon 10*p* displayed in the first bird's-eye view region P21, as illustrated in the screen 26*a*2 of FIG. 11.

Next, the steering angle acquisition unit 60 acquires the current steering angle θc (first steering angle) of the towing vehicle 10 based on a detection result of the steered angle sensor 44, for example (S116). Then, the turning center position calculation unit 64*b* calculates the towing vehicle turning center position Gc of the towing vehicle 10 based on the wheelbase length LV of the towing vehicle 10 acquired by the specification acquisition unit 64*a* and the steering angle θc acquired by the steering angle acquisition unit 60 (S118). In addition, the turning center position calculation unit 64*b* calculates the towed vehicle turning center position Gt of the towed vehicle 12 based on the wheelbase length LT of the towed vehicle 12 acquired by the specification acquisition unit 64*a* and the current coupling angle θt between the towing vehicle 10 and the towed vehicle 12 acquired by the first coupling information acquisition unit 62 (S120).

The comparison unit 64*c* compares the towing vehicle turning center position Gc calculated in S118 with the towed vehicle turning center position Gt calculated in S120 (S122).

Then, when the difference therebetween is the predetermined threshold m or less (Yes in S122), that is, when it can be regarded that the towing vehicle 10 and the towed vehicle 12 turn around substantially the same turning center position G, the second icon 12p2 indicating the future coupling posture of the towed vehicle 12 is hidden (S124). In this case, the towing vehicle 10 and the towed vehicle 12 move backward in a state where the coupling angle θt (first coupling angle) between the towing vehicle 10 and the towed vehicle 12 is maintained, so that the first icon 12P1 and the second icon 12p2 indicating the current coupling posture of the towed vehicle 12 may be overlapped so as not to be displayed. Since such a state is displayed, it is possible to allow the driver to intuitively understand that the towed vehicle 12 can travel while maintaining the current coupling angle θt (while maintaining the balance state) even if the towing vehicle 10 moves backward at the current steering angle θc. In this case, on the display device 26, an image displaying only the first icon 12p1 is displayed in the second bird's-eye view region P22 as in the screen 26a2 and a screen 26a5 in FIG. 11.

On the other hand, when the difference between the towing vehicle turning center position Gc and the towed vehicle turning center position Gt is greater than the predetermined threshold m in S122 (No in S122), the turning direction determination unit 64d determines a turning direction of a second icon 12P2 (S126). In this case, the turning direction determination unit 64d determines whether the towed vehicle 12 is moved in the angle increasing direction T1 or the angle decreasing direction T2 in the future from the current position of the towed vehicle 12 (the position of the coupling angle θt) based on a positional relationship between the towing vehicle turning center position Gc and the towed vehicle turning center position Gt as described in FIG. 8.

Subsequently, the drawing position determination unit 64e determines a drawing angle of the second icon 12p2 by multiplying the magnitude of the difference between the towing vehicle turning center position Gc and the towed vehicle turning center position Gt by the predetermined "conversion coefficient α" (S128). The indicator mode control unit 56b determines whether the jackknife condition (GL<Gt<GR) is satisfied, which is specified by the relationship among the towed vehicle turning center position Gt of the towed vehicle 12 corresponding to the determined drawing angle of the second icon 12p2, and the towing vehicle right turning center position GR and the towing vehicle left turning center position GL defined based on the specification of the towing vehicle 10 (S130). When the jackknife condition is not satisfied (No in S130), the second icon 12p2 is displayed in the normal mode (S132). In this case, the indicator mode control unit 56b displays the second icon 12p2 to light up, for example, in a yellow broken line as illustrated on a screen 26a3 in FIG. 11.

On the other hand, when the jackknife condition is satisfied (Yes in S130), the indicator mode control unit 56b displays the second icon 12p2 in a highlighted mode (S134). In this case, the indicator mode control unit 56b displays the second icon 12p2 to blink, for example, in a red broken line as illustrated on a screen 26a4 in FIG. 11.

In S112, when the first coupling information acquisition unit 62 cannot acquire the current coupling angle θt (first coupling angle) (No in S112), the traction assist mode is temporarily stopped. Examples of the state where the coupling angle θt cannot be acquired include a case where surroundings of the towed vehicle 12 gets dark, so that the coupling member 20 and the towed vehicle 12 are not sufficiently recognizable with the captured image data of the imaging unit 24. In addition, there is a case where a recognition mark configured to recognize a posture of the towed vehicle 12 is attached to, for example, a front wall of the towed vehicle 12, and the presence of the towed vehicle 12 and the coupling posture of the towed vehicle 12 are acquired by detecting the recognition mark on the captured image data. In this case, the recognition mark may become dirty due to dirt or the like and is not sufficiently detectable, or the periphery may become dark, so that the recognition mark is not detectable. Even in such a case, the acquisition of the coupling angle θt is not performed favorably. In addition, there is a case where the captured image data cannot be acquired due to a malfunction (failure or the like) of the imaging unit 24. Even in this case, the coupling angle θt cannot be acquired. In these cases, the real image P1 displayed on the display device 26 maintains the display of the current rear region of the towing vehicle 10, and the bird's-eye view image P2 maintains the display of only the third icon 10p.

If the display request for the icon of the towed vehicle 12 is not made in S100, or if the display request is canceled (No in S100), the mode is returned to the "normal monitoring mode" when the current mode is the "traction assist mode" (Yes in S136). That is, the real image P1 displayed on the display device 26 is returned to the front display image, and the icon display region (the second bird's-eye view region P22) of the towed vehicle 12 is not displayed (S138). That is, the display of the display device 26 is returned to, for example, the screen 26a1 in FIG. 11. In addition, at this time, a message such as "the normal monitoring mode has been restored" may be displayed on the screen 26a1 or may be provided in notification as a voice message via the sound output device 28. In addition, when the current mode is not in the "traction assist mode" in S136 (No in S136), the flow is temporarily terminated. Similarly, when the speed-change operation unit 52 is in the D range in S106 (Yes in S106), that is, when the driver indicates an intention for forward moving, the processing proceeds to S136. When the current mode is in the traction assist mode (Yes in S136), the mode is shifted to the normal monitoring mode (S138). When the current mode is the normal monitoring mode (No in S136), the flow is temporarily terminated as it is.

Since the above-described mode of the second icon 12p2 is displayed, it is possible to allow the driver to intuitively recognize that the towed vehicle 12 travels in the unbalance state while changing the coupling angle θt (for example, while increasing the coupling angle θt) when being moved backward with the current steering angle θc of the towing vehicle 10. In this case, the driver can change the drawing position of the second icon 12p2 based on the steering angle θc at the time of steering by steering the steering unit 42. As a result, the behavior of the towed vehicle 12 when the towing vehicle 10 is moved backward can be recognized before the towing vehicle 10 starts to move. In addition, it is possible to recognize in advance the steering requiring attention such as the "jackknife state", and it is easy to avoid falling into a state that requires time for posture recovery.

The flowchart illustrated in FIG. 10 is repeatedly executed at the predetermined control period, so that the second icon 12p2 indicating the future movement position of the towed vehicle 12 is displayed in accordance with the steering angle θc of the towing vehicle 10 at the time of executing the processing even after the backward moving of the towing vehicle 10 is started. Examples of the changes of the drawing positions of the first icon 12p1 and the second icon 12p2 when the towing vehicle 10 moves backward will be described in detail with reference to FIG. 11.

For example, when the towing vehicle 10 is started or moves forward, the screen 26a1 representing the "normal monitoring mode" is displayed. When the "traction assist mode" is requested, the first icon 12p1 indicating the current coupling posture of the towed vehicle 12 and the second icon 12p2 indicating the future coupling posture are displayed (the screen 26a3) based on the current steering angle $\theta c$ of the towing vehicle 10 (for example, turning right against the neutral position) as illustrated in the screen 26a2 and the screen 26a3. In this state, when the towing vehicle 10 moves backward, the towed vehicle 12 starts turning according to the current steering angle $\theta c$ (the first steering angle) and the coupling angle $\theta t$ (the first coupling angle), and accordingly, the drawing position of the first icon 12p1 also moves (turns counterclockwise) as illustrated in the screen 26a4. Furthermore, the drawing position of the second icon 12p2 indicating the future coupling posture also moves since the coupling angle $\theta t$ changes as the towed vehicle 12 turns. As an example, the screen 26a4 displays that the towed vehicle 12 is expected to be in the "jackknife state" in the future due to the backward moving of the towing vehicle 10.

It is possible to allow the driver to easily recognize that the towed vehicle 12 shifts to the "jackknife state" in case the backward moving is continued at the steering angle $\theta c$ in the state illustrated in the screen 26a4. Furthermore, it is possible to allow the driver to recognize that it is desirable to steer the steering unit 42 in the reverse direction before the towed vehicle 12 actually falls into the "jackknife state". When the driver steers the steering unit 42 in the reverse direction (turns right), the drawing position of the second icon 12p2 moves in the reverse direction as illustrated in the screen 26a5. The screen 26a5 displays a state where the first icon 12p1 overlaps the second icon 12p2. That is, it is possible to allow the driver to recognize that the backward movement can be performed in the balance state where the current coupling angle $\theta t$ (first coupling angle) is maintained when the backward moving is performed while maintaining the current steering angle $\theta c$.

In addition, when it is desired to change the coupling posture of the towed vehicle 12, the drawing position of the second icon 12p2 can be changed by further steering the steering unit 42 as illustrated in screens 26a6 and 26a7. For example, when it is desired to turn the towed vehicle 12 in the clockwise direction in the future, steering is performed such that the second icon 12p2 is drawn in the left direction of the first icon 12p1. Thereafter, the coupling posture (first coupling angle) of the towed vehicle 12 can be set to a desired angle by adjusting the steering unit 42 such that the drawing position of the second icon 12p2 approaches the drawing position of the first icon 12p1 while confirming the change of the drawing position (coupling posture) of the first icon 12p1. The screen 26a8 is an example in which the towing vehicle 10 and the towed vehicle 12 are adjusted so as to move backward in the balance state.

In this manner, when the towed vehicle 12 moves due to the backward moving of the towing vehicle 10, the drawing positions of the first icon 12p1 and the second icon 12p2 change in accordance with the first coupling angle (current coupling angle $\theta t$) of the towed vehicle 12 that actually changes. That is, the actual coupling posture of the towed vehicle 12 during the backward moving and the future coupling posture are displayed to the driver in a comparable mode using the first icon 12p1, the second icon 12p2, and the third icon 10p displayed in the bird's-eye view. Therefore, the current and future behaviors of the towed vehicle 12 can be more intuitively recognized even during the backward moving. As a result, it is possible to reduce the steering burden during the traction travel, in particular, during the backward moving.

Figure 12:
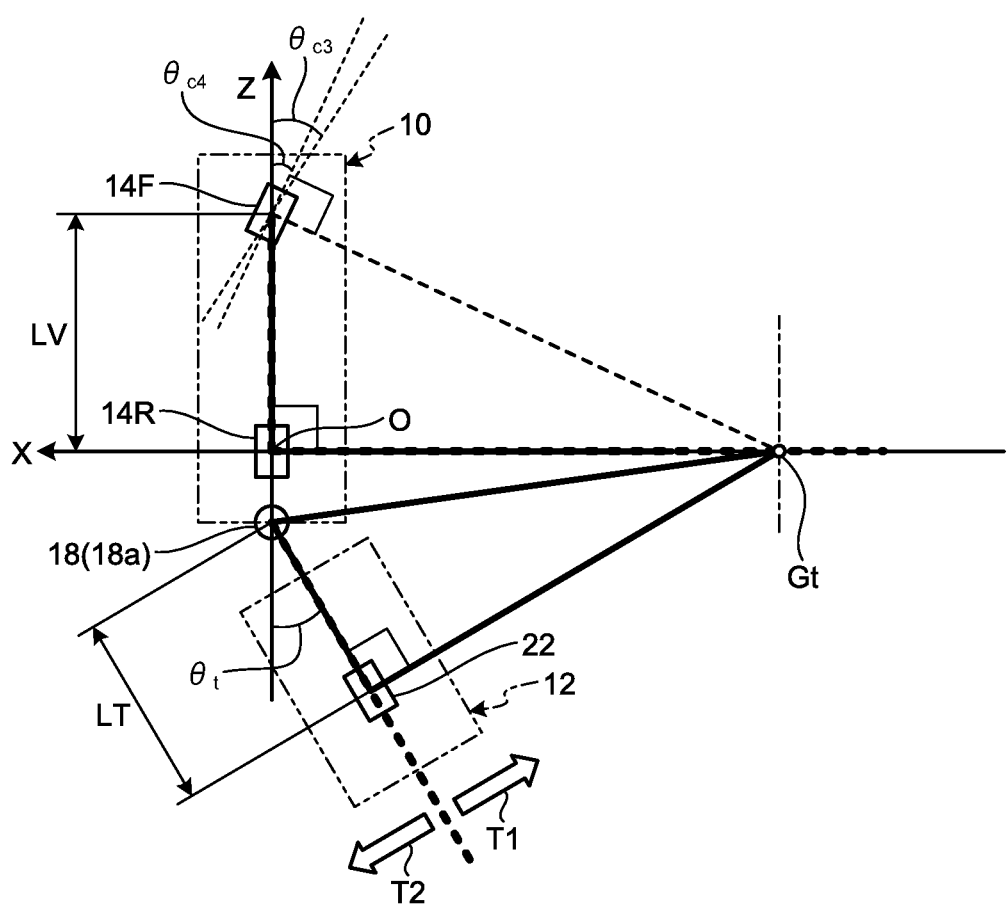
FIG. 12 is a schematic view for describing determination of a drawing position of the second indicator based on a relationship between a current steering angle of the towing vehicle and a steering angle of the towing vehicle turning at the towed vehicle turning center position.

FIG. 12 is a diagram for describing another calculation example of the drawing position of the second icon 12p2 described above. In the above-described example, the towed vehicle turning center position Gt where the towed vehicle 12 turns at the current coupling angle $\theta t$ (the first coupling angle) is compared with the towing vehicle turning center position Gc where the towing vehicle 10 turns at the current steering angle $\theta c$ (the first steering angle) and the future position (a coupling posture) of the towed vehicle 12 is calculated based on the difference therebetween. On the other hand, in the example illustrated in FIG. 12, a steering angle (the second steering angle) of the towing vehicle 10 is calculated (estimated), for which the towed vehicle turning center position Gt where the towed vehicle 12 turns at the coupling angle $\theta t$ (the first coupling angle) is set as a turning center. Then, the calculated steering angle (the second steering angle) is compared with the current steering angle (the first steering angle) of the towing vehicle 10, and a future position (a coupling posture) of the towed vehicle 12 is calculated based on the difference therebetween.

As described above, when the towed vehicle 12 is coupled to the towing vehicle 10 at the coupling angle $\theta t$ (the first coupling angle) acquired by the first coupling information acquisition unit 62, the towed vehicle turning center position Gt can be calculated based on the coupling angle $\theta t$ and the wheelbase length LT of the towed vehicle 12. The wheelbase length LV of the towing vehicle 10 is known through the specification acquisition unit 64a, so that a steering angle $\theta c3$ (second steering angle) in the case where the towing vehicle 10 turns at the towed vehicle turning center position Gt can be calculated backward. In addition, a current steering angle $\theta c4$ (the first steering angle) of the towing vehicle 10 can be acquired by the steering angle acquisition unit 60. In this case, when the towed vehicle 12 moves due to the backward moving of the towing vehicle 10, the towed vehicle 12 moves while exhibiting a behavior corresponding to a difference between the current steering angle $\theta c4$ and the steering angle $\theta c3$ calculated backward.

In the following description, the steering angle $\theta c$ will be described by denoting the counterclockwise turning with "+" and the clockwise turning with "−". In addition, the coupling angle $\theta t$ of the towed vehicle 12 will be also described by denoting the counterclockwise turning with "+" and the clockwise turning with "−".

For example, as illustrated in FIG. 12, it is assumed that the current coupling angle $\theta t$ (the first coupling angle) of the towed vehicle 12 is turned in the counterclockwise direction ("+" direction) with respect to the vehicle center axis M of the towing vehicle 10. In this case, when the steering angle $\theta c3$ (the second steering angle) of the towing vehicle 10, which is obtained with the towed vehicle turning center position Gt where the towed vehicle 12 turns at the coupling angle $\theta t$ as the turning center, is, for example, 40° with respect to a neutral point (the steering angle $\theta c=0°$) of the steering unit 42, and when the current steering angle $\theta c4$ (first steering angle) of the towing vehicle 10 is, for example, 10° ($\theta c3 > \theta c4$), the towing vehicle 10 is going to turn with a larger turning radius than a radius based on the towed vehicle turning center position Gt in this balance state. That is, the towed vehicle 12 is going to turn with a smaller turning radius than the towing vehicle 10. Therefore, when the towing vehicle 10 moves backward at the current steering angle $\theta c4$, the towed vehicle 12 is going to turn with a smaller turning angle than the current coupling angle θt and in a coupling posture that reduces the turning radius by the amount corresponding to the difference between the steering angle θc4 and the steering angle θc3. That is, the coupling angle θt of the towed vehicle 12 changes in the counter-clockwise direction (the angle increasing direction T1 of θt). The change amount of the coupling angle θt of the towed vehicle 12 corresponding to the difference between the steering angle θc4 and the steering angle θc3 differs depending on the wheelbase lengths of the towing vehicle 10 and the towed vehicle 12, which is similar to the above-described embodiment. Accordingly, the drawing position determination unit 64e determines the drawing position using, for example, a "conversion coefficient β" stored in the SSD 40d or the like. For example, when the difference between the steering angles is y°, the second icon is drawn at a position turned around the traction device 18 by an angle of β×y° from the current position of the towed vehicle 12 (the position of the first icon). When the relationship between the steering angle θc4 and the steering angle θc3 is θc3<θc4, the coupling angle θt of the towed vehicle 12 changes in the clockwise direction (the angle decrease direction T2 of θt) by an angle of β×y°.

Processing of determining the drawing position of the second icon 12p2 by the above-described comparison between the steering angles will be described with reference to a flowchart of FIG. 13. The processing is the same as that in the flowchart illustrated in FIG. 10 except for processes of performing acquisition of the steering angles and comparison between the steering angles. Therefore, the same processes as those in FIG. will be denoted by the same step numbers, and the detailed description thereof will be omitted.

Figure 13:
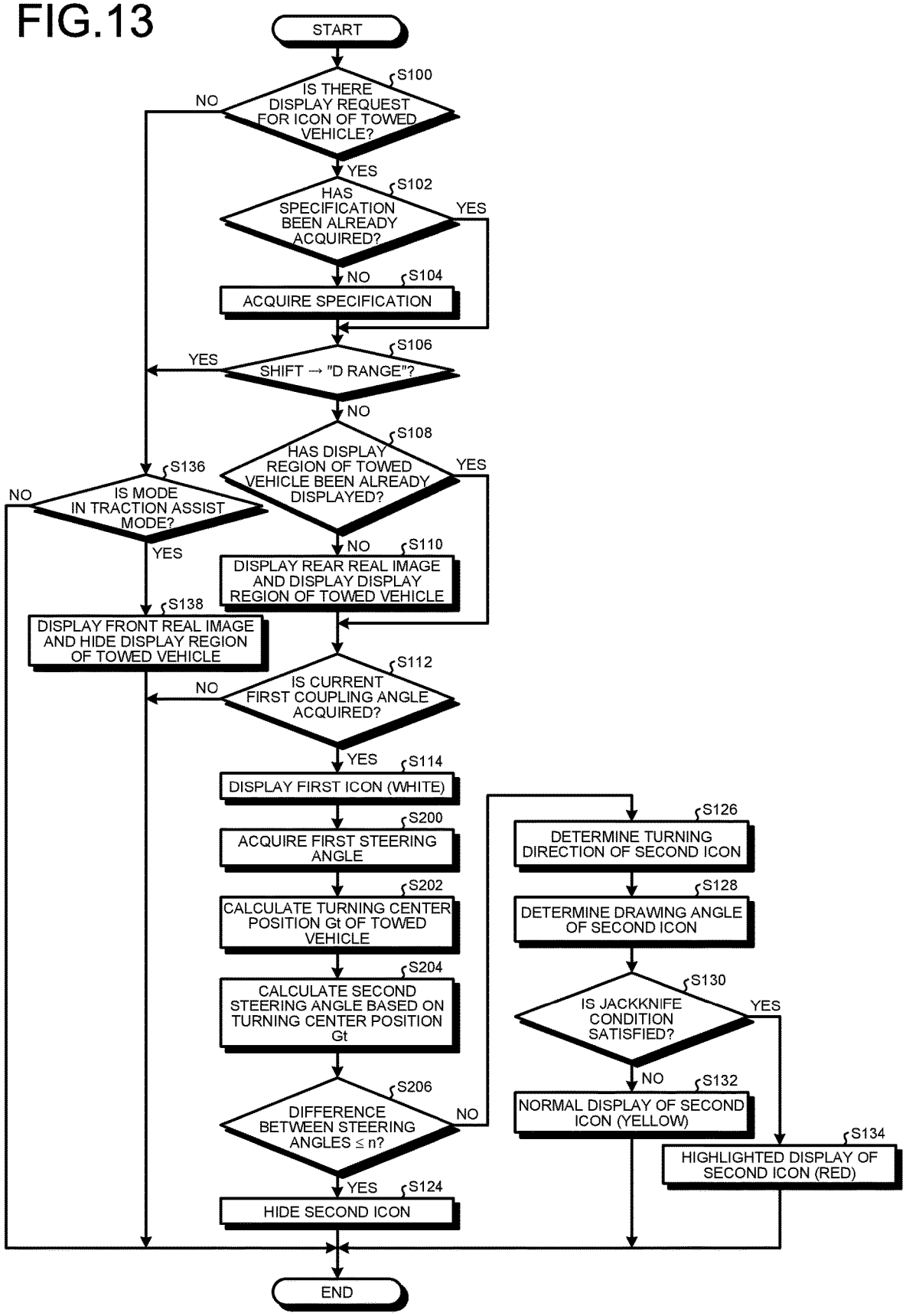
FIG. 13 is a flowchart for describing an example of a procedure of the indicator display process of FIG. 12.

Even in the flowchart of FIG. 13, confirmation of whether there is the display request for the towed vehicle icon (the second icon 12p2) (S100), acquisition of the specifications (S102 and S104), confirmation of whether it is in the D range (S106), and the like described in FIG. 10 are performed. Subsequently, presence or absence of display of the display region (the second bird's-eye view region P22) of the icon for the towed vehicle is confirmed (S108 and S110), and the acquisition of the coupling angle θt (the first coupling angle) is confirmed (S112). Then, when the coupling angle θt (the first coupling angle) has been acquired, the indicator mode control unit 56b displays the first icon 12p1 (S114).

Subsequently, the steering angle acquisition unit 60 acquires the current steering angle θc4 (the first steering angle) of the towing vehicle 10 from the steered angle sensor 44 (S200). The turning center position (the towed vehicle turning center position Gt) of the towed vehicle 12 is calculated based on the coupling angle θt acquired in S112 (S202). The steering angle θc3 (the second steering angle) of the towing vehicle 10 where the calculated towed vehicle turning center position Gt is used as the turning center is calculated (S204). Then, the current steering angle θc4 (the first steering angle) of the towing vehicle 10 acquired in S200 is compared with the steering angle θc3 (the second steering angle) acquired in S204. When the difference therebetween is a predetermined threshold n or less (Yes in S206), that is, when it can be regarded that the towing vehicle and the towed vehicle 12 turn around substantially the same turning center position G, the second icon 12p2 indicating the future coupling posture of the towed vehicle 12 is hidden (S124). In this case, the towing vehicle 10 and the towed vehicle 12 move backward in a state where the coupling angle θt (first coupling angle) between the towing vehicle 10 and the towed vehicle 12 is maintained. Thus, the first icon 12P1 and the second icon 12p2 indicating the current coupling posture of the towed vehicle 12 may be overlapped so as not to be displayed. Since such a state is displayed, it is possible to allow the driver to intuitively recognize that the towed vehicle 12 can travel while maintaining the current coupling angle θt (while maintaining the balance state) even if the towing vehicle 10 moves backward at the current steering angle θc. In this case, an image like the screen 26a2 or the screen 26a5 in FIG. 11 is displayed on the display device 26.

On the other hand, when the difference between the steering angle θc4 and the steering angle θc3 is greater than the predetermined threshold n in S206 (No in S206), the turning direction determination unit 64d determines a turning direction of the second icon 12P2 (S126). In this case, the turning direction can be calculated based on the turning direction of the towed vehicle 12 with respect to the vehicle center axis M of the towing vehicle 10 and the relationship between the steering angle θc4 and the steering angle θc3 as described above. In this case, the turning direction determination unit 64d determines whether the towed vehicle 12 is moved in the angle increasing direction T1 or the angle decreasing direction T2 in the future from the current position of the towed vehicle 12 (the position of the coupling angle θt) as described in FIG. 12.

Subsequently, the drawing position determination unit 64e determines a drawing angle of the second icon 12p2 by multiplying the magnitude of the difference between the current steering angle θc4 of the towing vehicle 10 and the steering angle θc3 calculated based on the towed vehicle turning center position Gt by the predetermined "conversion coefficient β" (S128). The indicator mode control unit 56b determines whether the jackknife condition (GL<Gt<GR) is satisfied, which is specified by the relationship among the towed vehicle turning center position Gt of the towed vehicle 12 corresponding to the determined drawing angle of the second icon 12p2 and the towing vehicle right turning center position GR and the towing vehicle left turning center position GL defined based on the specification of the towing vehicle 10 (S130). When the jackknife condition is not satisfied (No in S130), the second icon 12p2 is displayed in the normal mode (S132). In this case, the indicator mode control unit 56b displays the second icon 12p2 to light up, for example, in a yellow broken line as illustrated on a screen 26a3 in FIG. 11.

On the other hand, when the jackknife condition is satisfied (Yes in S130), the indicator mode control unit 56b displays the second icon 12p2 in a highlighted mode (S134). In this case, the indicator mode control unit 56b displays the second icon 12p2 to blink, for example, in a red broken line as illustrated on a screen 26a4 in FIG. 11. The processes in S136 and S138 are the same as those in FIG. 10, and the description thereof will be omitted.

In this manner, also in a case of using the steering angle, the drawing position of the second icon 12p2 can be determined in the same manner as the case where the turning center position G is used. In the above example, the drawing angle of the second icon 12p2 is determined by using the "conversion coefficient β" prepared in advance. In another embodiment, a deflection angle of the towing vehicle 10 where the backward moving is performed by a predetermined minute distance (ΔD) with a difference amount between the steering angle θc3 and the steering angle θc4 may be regarded as a deflection angle where the towed vehicle 12 moves backward. In this case, a calculation formula for the turning center position G, a calculation formula for a steering angle of the towing vehicle 10 using the turning center position G, a formula for calculating a deflection angle of the towed vehicle 12 where the backward moving is performed by the minute distance (ΔD) in the case where the difference exists between the steering angle θc3 (second steering angle) and the steering angle θc4 (first steering angle), and the like may be prepared in advance. The drawing position of the second icon 12p2 may be determined based on the calculated deflection angle, and the display of the second icon 12p2 similar to the above example can be executed.

Figure 14:
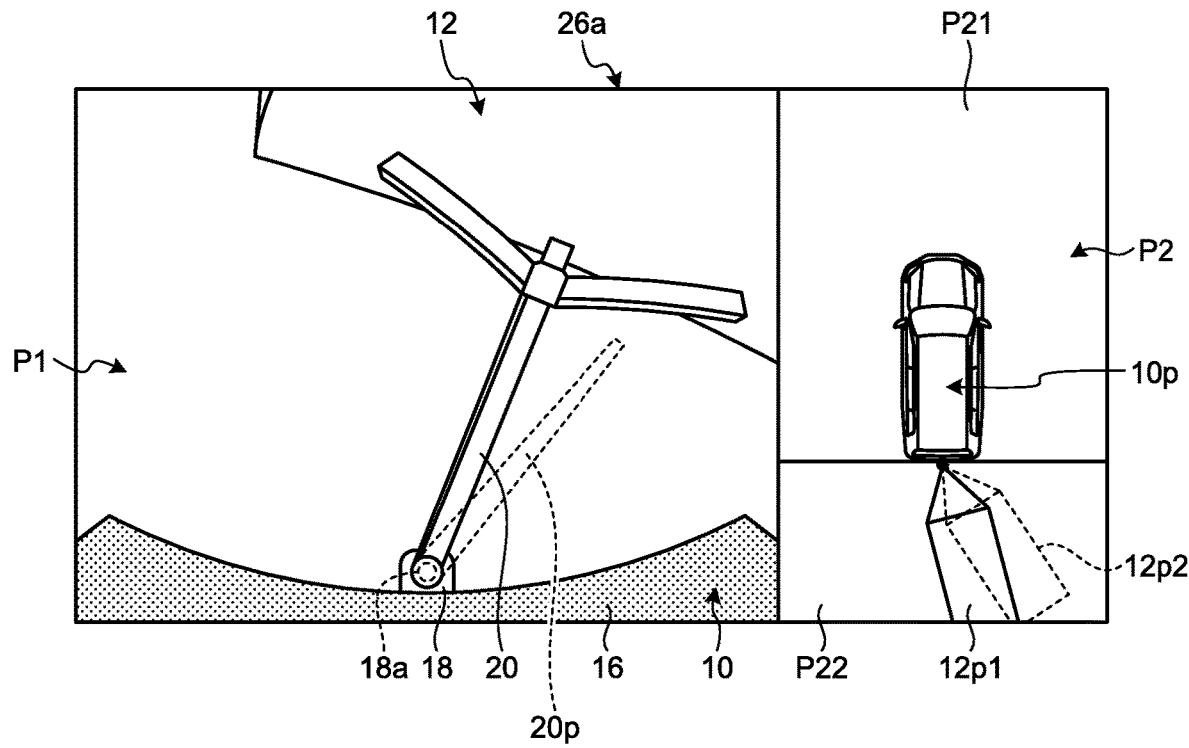
FIG. 14 is a diagram for describing a modification when a second indicator is displayed in the traction assist apparatus according to the embodiment.

FIG. 14 is a diagram illustrating an example of another display mode of the second icon (the second indicator) to display a future coupling posture of the towed vehicle 12. In the above-described example, as illustrated in FIG. 9, the second icon 12p2 is displayed together with the first icon 12p1 on the bird's-eye view image P2. In the example illustrated in FIG. 14, the future coupling posture (a coupling state) of the towed vehicle 12 is expressed by using a direction in which the coupling member 20 will move in the future on the real image P1. As described above, the towed vehicle 12 is coupled to the coupling member 20, and the coupling member 20 is fixed on the vehicle center axis M (the central portion in the vehicle width direction) in the front-rear direction of the towing vehicle 10. Thus, the towed vehicle 12 and the coupling member 20 turn around the traction device 18. Therefore, the coupling posture (a coupling angle θt) of the towed vehicle 12 can also be represented by a turning state of the coupling member 20. In this case, the coupling member 20 is a rod-shaped member, so that a change in the angle of the coupling member 20 can be expressed simply and clearly. In FIG. 14, the change in the angle of the coupling member 20 when the towing vehicle 10 moves backward at the current steering angle θc is indicated by the rod-shaped second icon 20p. A drawing position of the second icon 20p can be calculated in the same manner as the second icon 12p2 displayed in the second bird's-eye view region P22. In addition, when the drawing position of the second icon 20p almost overlaps with the coupling member 20 on a real image, the second icon 20p may be hidden similarly to the case where the second icon 12p2 is not displayed when the second icon 12p2 substantially overlaps the first icon 12p1. In addition, a display mode may be changed in accordance with the drawing position of the second icon 20p. For example, when a future turning angle of the coupling member 20 becomes a "jackknife state", a highlighting process may be performed, and red display or blinking display, for example, may be performed.

In this manner, when the second icon 20p is displayed on the real image P1 side, an object to be compared is the coupling member 20 displayed as the real image P1, so that the display processing becomes easy as compared to the case where both the first icon 12p1 and the second icon 12p2 are displayed on the second bird's-eye view region P22. When the second icon 20p (the second indicator) is displayed on the real image P1 side, the coupling member 20 imaged by the imaging unit 24 is displayed at a position corresponding to the first coupling information representing the current coupling posture of the towed vehicle 12. That is, the coupling member 20 displayed in the real image P1 can be regarded as the first indicator. Therefore, a comparison similar to the comparison between the first icon 12p1 and the second icon 12p2 performed on the bird's-eye view image P2 (the second bird's-eye view region P22) side can be performed on a large screen by comparing an image of the coupling member 20 displayed as the first indicator with the rod-shaped second icon 20p displayed as the second indicator. The towed vehicle 12 imaged by the imaging unit 24 is also displayed at the position corresponding to the first coupling information representing the current coupling posture, so that it can be regarded as the first indicator. In this case, the second icon 20p may be an icon indicating a shape (a posture) of the towed vehicle 12, and the same comparison can be performed and the same effect can be obtained.

As another embodiment, the bird's-eye view image P2 may be omitted and only the real image P1 may be displayed. In this case, the display region of the real image P1 can be enlarged, and the visibility of the real image P1 can be improved. Furthermore, the second icon 20p is also displayed to be enlarged, and the visibility of the second icon 20p can be improved together.

Figure 15:
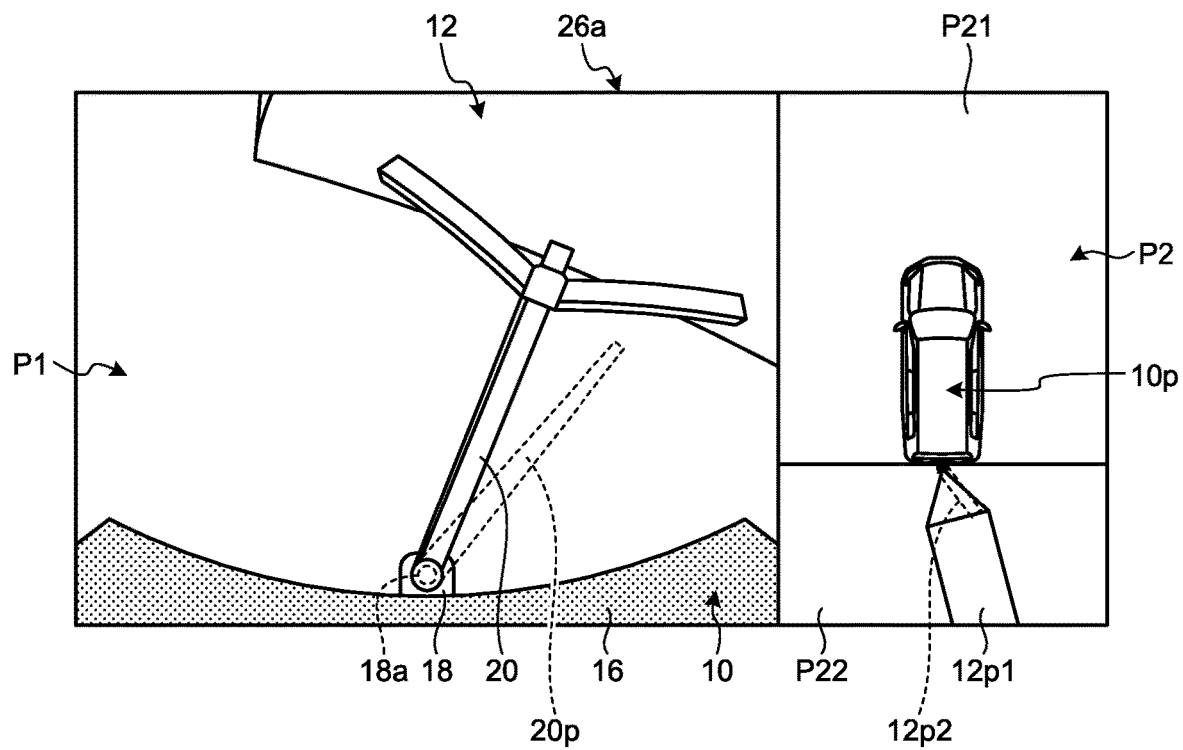
FIG. 15 is a diagram for describing another modification when a second indicator is displayed in the traction assist apparatus according to the embodiment.

FIG. 15 is a diagram for describing a modification of the display example of the second indicator illustrated in FIG. 14. In FIG. 14, the example is illustrated, in which the second icon 20p (for example, the rod-shaped icon) corresponding to the coupling member 20 is used as the second indicator in the real image P1. In a modification illustrated in FIG. 15, the rod-shaped second icon 20p is displayed on the real image P1 side similarly to FIG. 14, and the second icon 12p2 illustrated in the bird's-eye view image P2 (the second bird's-eye view region P22) is indicated by an icon having a simple shape (for example, a rod shape) corresponding to the coupling member 20. In this case, it becomes easy to distinguish the second icon 12p2 from the first icon 12p1 indicating the current coupling state (posture) of the towed vehicle 12. As illustrated in FIG. 15, the simple-shaped icons (the second icon 20p and the second icon 12p2), each indicating the future posture of the towed vehicle 12, are displayed on the real image P1 side and the bird's-eye view image P2 (the second bird's-eye view region P22), so that it becomes easier to intuitively recognize the future coupling posture (coupling angle) of the towed vehicle 12. In another embodiment, the second icon 12p2 having a simple shape (for example, a rod shape) may be displayed only on the second bird's-eye view region P22 side, while the current towed vehicle 12, the coupling member 20, and the like may be displayed on the real image P1 side. That is, only the first indicator may be displayed on the real image P1 side. In this case, it is possible to improve the visibility of the image in order to confirm the future coupling posture (a coupling angle) of the towed vehicle 12 on the second bird's-eye view region P22 side and to improve the visibility of the image to confirm the current state of the towed vehicle 12 on the real image P1 side.

In this manner, the traction assist system 100 displays change of the coupling posture between the towing vehicle 10 and the towed vehicle 12 when moving backward while maintaining the steering angle of the current towing vehicle 10 in the mode in which the current coupling posture and the future coupling posture of the towed vehicle 12 can be compared. As a result, it becomes easy for the driver (a user) to intuitively recognize the future behavior of the towed vehicle 12. In addition, it is also possible to contribute to the reduction of the handling burden of the driver.

In the above embodiment, the background of the second bird's-eye view region P22 is colored in black has been described. Alternatively, a bird's-eye view image, which illustrates a state around the towed vehicle 12 generated based on captured image data may be displayed in the second bird's-eye view region P22 similarly to the first bird's-eye view region P21. In this case, the first icon 12p1 illustrated in the second bird's-eye view region P22 may be a simple icon illustrated in a line drawing similarly to that of the above embodiment, or may be an icon having a shape or color close to the actual towed vehicle 12 stored in advance in the ROM 40b or the SSD 40d. In addition, the second icon 12p2 displayed together with the first icon 12p1 may also be an icon of a simple line drawing or may be an icon having a shape or color close to the actual towed vehicle 12. As the background of the second bird's-eye view region P22 is made into the bird's-eye view image illustrating the actual surrounding state of the towed vehicle 12 in this manner, it is possible to make it easier to grasp a relationship between the towed vehicle 12 and the periphery of the towed vehicle 12, and particularly a positional relationship between the towed vehicle 12 and an obstacle or the like when there is the obstacle or another vehicle around the towed vehicle 12.

The bird's-eye view image illustrating the surrounding state of the towed vehicle 12 may be generated based on, for example, captured image data imaged by an imaging unit (a camera) mounted at a rear end, a side end, a front end, or the like of the towed vehicle 12. In another example, the bird's-eye view image illustrating the surrounding state of the towed vehicle 12 may be generated by using the captured image data imaged on the towing vehicle 10 side used when generating the bird's-eye view image displayed in the first bird's-eye view region P21. In this case, the imaging unit is mainly provided on a door mirror or the like of the towing vehicle 10, and the captured image data obtained by imaging the side and rear of the towing vehicle 10 is used. Thus, processing such as distortion correction may be performed as appropriate. In addition, in another example, the bird's-eye view image may be generated around the towed vehicle 12 by using data captured in the past out of the captured image data imaged on the towing vehicle 10 side in order to generate the bird's-eye view image to be displayed in the first bird's-eye view region P21. That is, the bird's-eye view image is generated by using the captured image data imaged when the towing vehicle 10 has existed in the past at the position where the towed vehicle 12 currently exists, and the first icon 12p1 and the second icon 12p2 are superimposed. In this case, it is possible to generate the bird's-eye view image with less distortion as compared with the case where the bird's-eye view image around the towed vehicle 12 is generated by using captured image data currently captured by the towing vehicle 10. However, a time lag occurs because the bird's-eye view image is generated based on the past captured image data. For example, when there is a moving object, such as a pedestrian, around the towed vehicle 12, it is desirable to call attention since a position in the bird's-eye view image to be displayed may be different from an actual position of the moving body.

The traction assist program to be executed by the CPU 40a of the present embodiment may be configured to be provided in the state of being recorded in a computer-readable recording medium such as a CD-ROM, a flexible disk (FD), a CD-R, and a digital versatile disk (DVD) as a file in an installable or executable format.

Furthermore, the traction assist program may be configured to be stored on a computer coupled to a network such as the Internet and to be provided by download via a network. In addition, the traction assist program to be executed in the present embodiment may be configured to be provided or distributed via a network such as the Internet.

Although the embodiments and modifications of the present invention have been described, these embodiments and modifications are presented as examples and are not intended to limit the scope of the invention. These novel embodiments can be implemented in various other modes, and various omissions, substitutions, and alterations can be made within a scope not departing from a gist of the invention. These embodiments and modifications thereof are included in the scope and the gist of the invention, and are included in the invention described in the claims and the equivalent scope thereof.

EXPLANATIONS OF LETTERS OR NUMERALS

10: towing vehicle, 12: towed vehicle, 12p1: first icon, 12p2 and 20p: second icon, 18: traction device, 20: coupling member, 24: imaging unit, 26: display device, 26a: screen, 40: ECU, 40a: CPU, 44: steered angle sensor, 52: speed-change operation unit, 54: acquisition unit, 56: indicator display control unit (control unit), 56a: display image control unit, 56b: indicator mode control unit, 58: display switching reception unit, 60: steering angle acquisition unit, 62: first coupling information acquisition unit, 64: second coupling information acquisition unit, 64a: specification acquisition unit, 64b: turning center position calculation unit, 64c: comparison unit, 64d: turning direction determination unit, 64e: drawing position determination unit, 100: traction assist system, Gc: towing vehicle turning center position, Gt: towed vehicle turning center position, P1: real image, P2: bird's-eye view image

The invention claimed is:

1. A traction assist apparatus comprising:
a memory; and
a hardware processor coupled to the memory, the hardware processor being configured to:
acquire first coupling information representing a current coupling posture of a towed vehicle to a towing vehicle and acquire second coupling information representing a future coupling posture of the towed vehicle where the towing vehicle moves backward at a current steering angle; and
display a first indicator and a second indicator on a display device in a comparable mode, the first indicator indicating the towed vehicle corresponding to the first coupling information, the second indicator indicating the towed vehicle corresponding to the second coupling information,
wherein the second indicator is displayed on a side of the first indicator to indicate a direction in which the coupling angle between the towing vehicle and the towed vehicle is changing, and displayed overlapping the first indicator when the coupling angle is not changing.

2. The traction assist apparatus according to claim 1, wherein the hardware processor
acquires a towing vehicle turning center position where the towing vehicle moves backward at the current steering angle and a towed vehicle turning center position where the towed vehicle moves backward in the coupling posture corresponding to the first coupling information, and
acquires the second coupling information based on a comparison result between the towing vehicle turning center position and the towed vehicle turning center position.

3. The traction assist apparatus according to claim 1, wherein the hardware processor
acquires a first steering angle indicating the current steering angle of the towing vehicle, a towed vehicle turning center position of the towed vehicle based on the first coupling information, and a second steering angle indicating a steering angle of the towing vehicle where the towed vehicle turning center position is used as a turning center, and acquires the second coupling information based on a comparison result between the first steering angle and the second steering angle.

4. The traction assist apparatus according to claim 1, wherein the hardware processor changes a display mode of the second indicator in accordance with magnitude of a difference between the first coupling information and the second coupling information.

5. The traction assist apparatus according to claim 4, wherein the hardware processor displays the second indicator to be highlighted when a towed vehicle turning center position of the towed vehicle based on the first coupling information exists, on an extension line of a rear wheel axle of the towing vehicle, between a towing vehicle right turning center position based on a maximum right steering angle of the towing vehicle and a towing vehicle left turning center position based on a maximum left steering angle, the maximum right steering angle and the maximum left steering angle being defined with a current position of the towing vehicle as a center.

6. The traction assist apparatus according to claim 4, wherein the hardware processor hides the second indicator when the difference between the first coupling information and the second coupling information is a predetermined minimum value or less.

7. The traction assist apparatus according to claim 1, wherein the hardware processor displays, on the display device in a bird's-eye view, at least either the first indicator or the second indicator and a third indicator indicating the towing vehicle.

8. The traction assist apparatus according to claim 7, wherein the hardware processor hides the first indicator and the second indicator when the first coupling information cannot be acquired.

9. A traction assist apparatus comprising:

a memory; and a hardware processor coupled to the memory, the hardware processor being configured to:

acquire first coupling information representing a current coupling posture of a towed vehicle to a towing vehicle and acquire second coupling information representing a future coupling posture of the towed vehicle where the towing vehicle moves backward at a current steering angle;

display a first indicator and a second indicator on a display device in a comparable mode, the first indicator indicating the towed vehicle corresponding to the first coupling information, the second indicator indicating the towed vehicle corresponding to the second coupling information;

acquires a towing vehicle turning center position where the towing vehicle moves backward at the current steering angle and a towed vehicle turning center position where the towed vehicle moves backward in the coupling posture corresponding to the first coupling information, and acquires the second coupling information based on a comparison result between the towing vehicle turning center position and the towed vehicle turning center position.

10. A traction assist apparatus comprising:

a memory; and a hardware processor coupled to the memory, the hardware processor being configured to:

acquire first coupling information representing a current coupling posture of a towed vehicle to a towing vehicle and acquire second coupling information representing a future coupling posture of the towed vehicle where the towing vehicle moves backward at a current steering angle;

display a first indicator and a second indicator on a display device in a comparable mode, the first indicator indicating the towed vehicle corresponding to the first coupling information, the second indicator indicating the towed vehicle corresponding to the second coupling information;

acquires a first steering angle indicating the current steering angle of the towing vehicle, a towed vehicle turning center position of the towed vehicle based on the first coupling information, and a second steering angle indicating a steering angle of the towing vehicle where the towed vehicle turning center position is used as a turning center, and acquires the second coupling information based on a comparison result between the first steering angle and the second steering angle.

11. A traction assist apparatus comprising:

a memory; and a hardware processor coupled to the memory, the hardware processor being configured to:

acquire first coupling information representing a current coupling posture of a towed vehicle to a towing vehicle and acquire second coupling information representing a future coupling posture of the towed vehicle where the towing vehicle moves backward at a current steering angle;

display a first indicator and a second indicator on a display device in a comparable mode, the first indicator indicating the towed vehicle corresponding to the first coupling information, the second indicator indicating the towed vehicle corresponding to the second coupling information; and display the second indicator to be highlighted when a towed vehicle turning center position of the towed vehicle based on the first coupling information exists, on an extension line of a rear wheel axle of the towing vehicle, between a towing vehicle right turning center position based on a maximum right steering angle of the towing vehicle and a towing vehicle left turning center position based on a maximum left steering angle, the maximum right steering angle and the maximum left steering angle being defined with a current position of the towing vehicle as a center.

* * * * *